US011156312B1

(12) United States Patent
Aguiluz et al.

(10) Patent No.: US 11,156,312 B1
(45) Date of Patent: Oct. 26, 2021

(54) TENSILE CAPACITY ELECTROFUSION PIPELINE SYSTEMS AND METHODS

(71) Applicant: Trinity Bay Equipment Holdings, LLC, Houston, TX (US)

(72) Inventors: Efrain Aguiluz, Houston, TX (US); Matthew Allen Hegler, Kingwood, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/993,344

(22) Filed: Aug. 14, 2020

(51) Int. Cl.
| F16L 13/04 | (2006.01) |
| F17D 1/02 | (2006.01) |
| F17D 1/08 | (2006.01) |
| F16L 47/03 | (2006.01) |
| F16L 47/12 | (2006.01) |
| B29C 65/56 | (2006.01) |
| B29C 65/34 | (2006.01) |
| B29C 65/00 | (2006.01) |

(52) U.S. Cl.
CPC ............ *F16L 13/04* (2013.01); *B29C 65/564* (2013.01); *B29C 65/568* (2013.01); *F16L 47/03* (2013.01); *F16L 47/12* (2013.01); *F17D 1/02* (2013.01); *F17D 1/08* (2013.01); *B29C 65/342* (2013.01); *B29C 66/5229* (2013.01); *B29C 66/72321* (2013.01)

(58) Field of Classification Search
CPC . F16L 13/04; F16L 13/06; F16L 47/03; F16L 47/12; F16L 37/244; F16L 37/24; F16L 37/1235; F16L 37/12; B29L 65/564; B29L 65/568

USPC .......................... 285/21.1, 21.2, 286.1, 286.2
See application file for complete search history.

(56) References Cited

U.S. PATENT DOCUMENTS

| 6,428,054 | B1 * | 8/2002 | Zappa ................... B29C 65/342 285/123.1 |
| 6,676,166 | B1 * | 1/2004 | Wraith ................ F16L 37/0841 285/255 |
| 10,753,512 | B1 * | 8/2020 | Hegler ................ F16L 33/2073 |
| 2005/0073145 | A1 * | 4/2005 | Boudry ............... B29C 66/7234 285/21.2 |
| 2010/0084097 | A1 * | 4/2010 | Stauffer ........... B29O 66/52294 156/379.8 |
| 2011/0049874 | A1 * | 3/2011 | Parker ................... B29C 65/565 285/337 |

* cited by examiner

*Primary Examiner* — Aaron M Dunwoody
(74) *Attorney, Agent, or Firm* — Conrad J. Hsu

(57) ABSTRACT

Techniques for implementing a pipeline system that includes a pipe segment and a pipe fitting. The pipe segment includes tubing, which includes an inner barrier layer that defines a pipe bore, a reinforcement layer implemented around the inner barrier layer to define a fluid conduit, and an outer barrier layer implemented around the reinforcement layer, and a tensile clip secured to the tubing such that clip legs of the tensile clip are secured around the reinforcement layer. The pipe fitting includes electrofusion material implemented to define a fitting bore and a tubing cavity in which the tubing is to be secured and a tensile hook partially embedded within the electrofusion material such that a hook bend extends into the tubing cavity, in which the hook bend matingly interlock with a loop end of the tensile clip to facilitate transferring tensile force between the reinforcement layer and the pipe fitting.

20 Claims, 7 Drawing Sheets

US 11,156,312 B1

TENSILE CAPACITY ELECTROFUSION PIPELINE SYSTEMS AND METHODS

BACKGROUND

The present disclosure generally relates to pipeline systems and, more particularly, to an electrofusion pipe fitting and one or more pipe segments that may be deployed in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings (e.g., connectors), for example, which are used to couple a pipe segment to another pipe segment, to a fluid source, and/or to a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid.

To facilitate improving fluid isolation, in some instances, the tubing of a pipe segment may be implemented with multiple layers. For example, the tubing of a pipe segment may include an inner (e.g., innermost) barrier layer (e.g., liner or sheath) and an outer (e.g., outermost) barrier layer (e.g., shield or sheath) that each run (e.g., span) the length of the pipe segment. To facilitate improving its tensile strength and/or its hoop strength, the tubing of the pipe segment may additionally include one or more reinforcement layers, which are implemented between the inner barrier layer and the outer barrier layer using a solid material that has a higher tensile strength and/or a higher hoop strength as compared to the solid material that is used to implement the inner barrier layer and/or the outer barrier layer.

Moreover, in some instances, a pipe fitting may be implemented to be secured to the tubing of a pipe segment using electrofusion techniques. In particular, in such instances, the electrofusion pipe fitting may be secured to the pipe segment tubing at least in part by heating the electrofusion pipe fitting such that electrofusion material (e.g., plastic) implemented in the electrofusion pipe fitting bonds with electrofusion material used to implement the inner barrier layer and/or the outer barrier layer of the pipe segment tubing. However, at least in some instances, the tensile capacity (e.g., strength) of a bond between electrofusion material may be weaker than the tensile capacity of solid material implemented in one or more reinforcement layers of the pipe segment tubing and, thus, potentially limit the tensile capacity of a pipeline system in which the electrofusion pipe fitting and the pipe segment tubing are deployed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment, which includes tubing, in which the tubing includes an inner barrier layer that defines a pipe bore, a reinforcement layer implemented around the inner barrier layer to define a fluid conduit within the tubing, and an outer barrier layer implemented around the reinforcement layer, and a tensile clip secured to the tubing such that clip legs of the tensile clip are secured around the reinforcement layer of the tubing. Additionally, the pipeline system includes a pipe fitting, which includes electrofusion material implemented to define a fitting bore and a tubing cavity in which the tubing of the pipe segment is to be secured and a tensile hook partially embedded within the electrofusion material such that a hook bend of the tensile hook extends into the tubing cavity, in which the hook bend of the tensile hook matingly interlock with a loop end of the tensile clip that is secured to the tubing of the pipe segment to facilitate transferring tensile force between the reinforcement layer of the tubing and the pipe fitting.

In another embodiment, a method of implementing a pipeline system includes securing a tensile clip to tubing of a pipe segment that includes a reinforcement layer implemented between an inner barrier layer of the tubing and an outer barrier layer of the tubing at least in part by inserting clip legs of the tensile clip into corresponding clip openings in the tubing of the pipe segment and circumferentially compressing the tubing of the pipe segment around the clip legs of the tensile clip to enable the clip legs of the tensile clip to grab onto the reinforcement layer in the tubing of the pipe segment. Additionally, the method includes inserting the tensile clip and the tubing of the pipe segment into a tubing cavity of a pipe fitting that is defined by electrofusion material of the pipe fitting, in which the pipe fitting includes a tensile hook that extends out from the electrofusion material into the tubing cavity and rotating the pipe fitting relative to the pipe segment such that the tensile hook of the pipe fitting matingly interlocks with the tensile clip that is secured to the tubing of the pipe segment to facilitate transferring tensile force between the pipe segment and the pipe fitting using non-electrofusion material.

In another embodiment, an electrofusion pipe fitting includes a tubing cavity in which tubing of a pipe segment is to be secured, in which the tubing cavity is defined using electrofusion material and a tensile hook. The tensile hook includes a hook shaft that is at least partially embedded within the electrofusion material of the electrofusion pipe fitting and a hook bend that extends out from the hook shaft within the tubing cavity of the electrofusion pipe fitting, in which the hook bend matingly interlocks with a loop end of a tensile clip that is secured around one or more reinforcement layers of the tubing of the pipe segment to facilitate transferring tensile force between the electrofusion pipe fitting and the pipe segment via the tensile clip that is secured to the tubing of the pipe segment and the tensile hook of the electrofusion pipe fitting.

DETAILED DESCRIPTION

Figure 1:
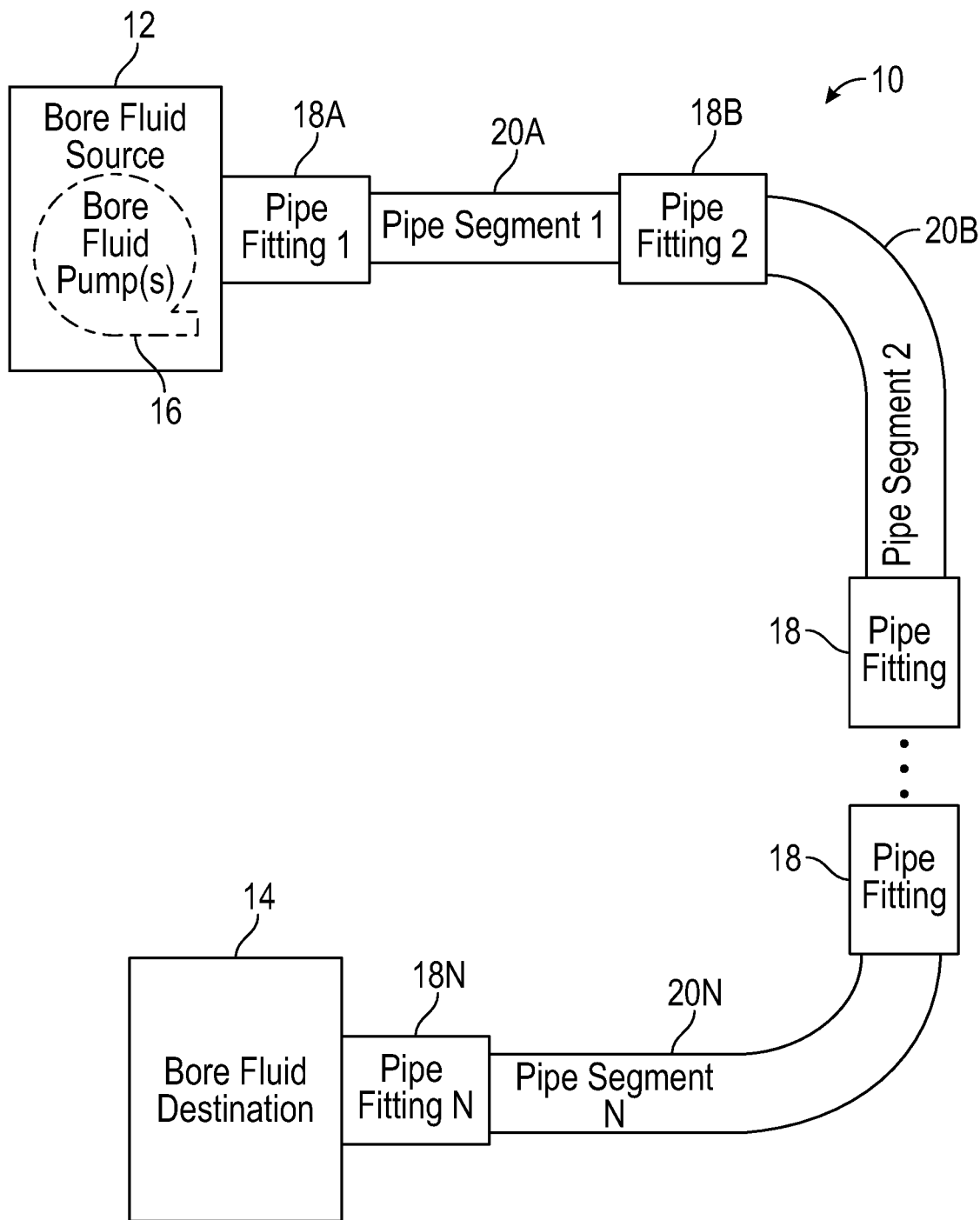
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing, which defines (e.g., encloses) a pipe bore that provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple layers. For example, the tubing of a pipe segment may include an inner (e.g., innermost) barrier layer (e.g., liner or sheath) and an outer (e.g., outermost) barrier layer (e.g., shield or sheath) that each run (e.g., span) the length of the pipe segment. To facilitate blocking fluid flow directly therethrough, the inner barrier layer and the outer barrier layer may each be a continuous layer of solid material, such as plastic, that runs the length of the pipe segment.

To facilitate improving its tensile strength and/or its hoop strength, in some instances, the tubing of a pipe segment may additionally include one or more reinforcement layers implemented between its inner barrier layer and its outer barrier layer. In particular, a reinforcement layer of the pipe segment tubing may be implemented with a solid material that has a higher tensile strength and/or a higher hoop strength as compared to a solid material that is used to implement the inner barrier layer and/or the outer barrier layer of the pipe segment tubing. For example, the reinforcement layer of the pipe segment tubing may be implemented using metal, such as steel, while the inner barrier layer and the outer barrier layer of the pipe segment tubing are implemented using plastic, such as high-density polyethylene (HDPE).

Additionally, in some instances, a pipe fitting may be implemented to be secured to the tubing of a pipe segment using swaging techniques. In particular, in such instances, the pipe segment tubing may be inserted into the pipe fitting and swaging techniques may be used to conformally deform the pipe fitting around the pipe segment tubing. In other words, in such instances, the pipe fitting may be implemented using metal to enable the conformal deformation to secure the pipe fitting to the pipe segment tubing. However, a metal pipe fitting is generally heavy and, thus at least in some instances, may potentially limit deployment efficiency of a pipeline system in which the metal pipe fitting is to be deployed, for example, due to the weight of the metal pipe fitting resulting in deployment equipment, such as a crane, being used to move the metal pipe fitting to a target deployment location in the pipeline system.

As such, to facilitate improving pipeline deployment efficiency, in other instances, a pipe fitting may be implemented using electrofusion material, such as plastic, to enable the pipe fitting to be secured to the tubing of a pipe segment at least in part using electrofusion techniques. In particular, in such instances, the electrofusion material in the electrofusion pipe fitting may be implemented to define a fitting bore through the electrofusion pipe fitting as well as one or more tubing cavities in which the tubing of corresponding pipe segments are to be secured. Additionally, the electrofusion pipe fitting may include one or more heating wires embedded in its electrofusion material, for example, such that the one or more heating wires are proximate to a tubing cavity of the electrofusion pipe fitting. As such, when electrical power is applied (e.g., supplied) to a heating wire embedded within the electrofusion pipe fitting, the electrical resistance of the heating wire may produce heat that causes electrofusion material in the electrofusion pipe fitting to melt and, thus, bond (e.g. fuse) with electrofusion material in the inner barrier layer and/or the outer barrier layer of the pipe segment tubing once the heat is removed.

However, as described above, the tubing of a pipe segment generally includes one or more reinforcement layers implemented between its inner barrier layer and its outer barrier layer to facilitate improving tensile strength and/or hoop strength of the pipe segment. Moreover, at least in some instances, the tensile capacity (e.g., strength) of a bond between electrofusion material (e.g., plastic) may be weaker than the tensile strength provided by the one or more reinforcement layers of the pipe segment. In other words, at least in such instances, deploying an electrofusion pipe fitting in a pipeline system such that it relies solely on a bond between electrofusion material may limit tensile capacity (e.g., strength) of the pipeline system and, thus, potentially limit operational efficiency and/or operational reliability of the pipeline system, for example, due to exertion of a tensile force that exceeds the tensile capacity of the bond between the electrofusion material resulting in the electrofusion pipe fitting separating from a pipe segment fluidly coupled thereto.

Accordingly, to facilitate improving pipeline operational efficiency and/or operational reliability, the present disclosure provides techniques for implementing and/or deploying an electrofusion pipe fitting in a pipeline system to facilitate improving the tensile capacity (e.g., strength) of the pipeline system. As described above, the tensile strength of a reinforcement layer of a pipe segment secured to an electrofusion pipe fitting may generally be stronger than a bond between electrofusion material in the electrofusion pipe fitting and electrofusion material in the tubing of the pipe segment. As such, to facilitate improving tensile strength provided by the electrofusion pipe fitting and, thus, the tensile capacity of the pipeline system, as will be described in more detail below, the electrofusion pipe fitting may be secured to one or more reinforcement layers of the pipe segment.

To facilitate securing an electrofusion pipe fitting to one or more reinforcement layers of a pipe segment, one or more tensile clips may be secured to the tubing of the pipe segment. More specifically, a tensile clip to be secured to pipe segment tubing may include a loop end and one or more clip legs that extend out from the loop end. Additionally, the tubing of the pipe segment may include one or more clip openings, which are each implemented to enable a clip leg of a corresponding tensile clip to be secured therein, for example, via an interference (e.g., press and/or friction) fit. In other words, as will be described in more detail below, a tensile clip may be secured to the tubing of the pipe segment at least in part by inserting one or more clip legs of the tensile clip into corresponding clip openings implemented in the tubing of the pipe segment.

To facilitate securing a tensile clip to the tubing of a pipe segment, in some embodiments, the pipe segment tubing may then be circumferentially compressed such that the clip legs of the tensile clip are forced toward one or more reinforcement layers of the pipe segment tubing and, thus, grab onto the one or more reinforcement layers of the pipe segment tubing. In fact, in some such embodiments, special-purpose deployment equipment may be implemented and/or operated to circumferentially compress the tubing of a pipe segment, for example, to facilitate securing a tensile clip to the pipe segment tubing. In particular, in some such embodiments, the special-purpose deployment equipment may include a backing cylinder, which is implemented to be at least partially inserted into a pipe bore defined by the tubing of the pipe segment. The special-purpose deployment equipment may additionally include one or more actuators, which are each implemented and/or operated to selectively actuate a piston (e.g., arm) toward the backing cylinder, thereby compressing pipe segment tubing disposed therebetween.

In any case, as described above, the tubing of a pipe segment and, thus, a tensile clip that is secured to the pipe segment tubing may be secured in a tubing cavity of an electrofusion pipe fitting. In particular, to facilitate securing the electrofusion pipe fitting to the tensile clip, the electrofusion pipe fitting may include a tensile hook that partially extends into the tubing cavity of the electrofusion pipe fitting. In particular, in some embodiments, the tensile hook may include a hook shaft, which is implemented to be at least partially embedded within the electrofusion material (e.g., plastic) of the electrofusion pipe fitting, and a hook bend, which is implemented to extend out from the hook shaft and the electrofusion material into the tubing cavity of the electrofusion pipe fitting. As such, in some embodiments, an electrofusion pipe fitting may be implemented at least in part by holding one or more tensile hooks and one or more heating wires at corresponding target positions in an electrofusion material mold and, subsequently, disposing (e.g., pouring) electrofusion material in the electrofusion material mold.

Additionally, in some embodiments, a tensile hook may be implemented in an electrofusion pipe fitting such that its hook bend is oriented circumferentially within a corresponding tubing cavity of the electrofusion pipe fitting. Furthermore, in some embodiments, the hook bend of the tensile hook may be implemented to matingly interlock (e.g., engage and/or interface) with the loop end of a corresponding tensile clip. Thus, in such embodiments, the electrofusion pipe fitting may be secured to a pipe segment at least in part by inserting an end of its tubing to which a tensile clip is secured into a tubing cavity of the electrofusion pipe fitting and, subsequently, rotating the electrofusion pipe fitting relative to the pipe segment such that the hook bend of the tensile hook matingly interlocks with the loop end of the tensile clip.

In other words, in such embodiments, an electrofusion pipe fitting may be secured to the tubing of a pipe segment at least in part by maintaining the electrofusion pipe fitting in a position relative to the pipe segment at which a hook bend of a tensile hook implemented in the electrofusion pipe fitting is matingly interlocked with the loop end of a tensile clip that is secured to the pipe segment tubing. To facilitate maintaining the electrofusion pipe fitting in the position at which the hook bend of its tensile hook is matingly interlocked with the loop end of the tensile clip, electrical power may be supplied to one or more heating wires embedded in the electrofusion pipe fitting to facilitate bonding electrofusion material (e.g., plastic) implemented in the electrofusion pipe fitting with electrofusion material in the pipe segment tubing and, thus, maintaining the electrofusion pipe fitting stationary relative to the pipe segment. In this manner, tensile force exerted on a pipeline system in which the pipe segment and the electrofusion pipe fitting are deployed may be transferred between the pipe segment and the electrofusion pipe fitting via a tensile clip, which grabs onto one or more reinforcement layers of the pipe segment, and a corresponding tensile hook, which is partially embedded within electrofusion material of the electrofusion pipe fitting and matingly interlocked with the tensile clip.

To facilitate further improving tensile strength of a pipeline system, is some embodiments, the techniques described in the present disclosure may facilitate implementing an electrofusion midline pipe fitting, which facilitates transferring tensile force between reinforcement layers of pipe segments secured thereto. In particular, in such embodiments, the electrofusion midline pipe fitting may include a first tubing cavity in which the tubing of a first pipe segment is to be secured and a second tubing cavity in which the tubing of a second pipe segment is to be secured. Thus, to facilitate transferring tensile force between one or more reinforcement layers of the first pipe segment and one or more reinforcement layers of the second pipe segment, a tensile hook of the electrofusion midline pipe fitting may include a first hook bend, which is implemented to matingly interlock with the loop end of a first tensile clip that is secured to the tubing of the first pipe segment and, thus, extends out from the electrofusion material of the electrofusion midline pipe fitting into the first tubing cavity as well as a second hook bend, which is implemented to matingly interlock with the loop end of a second tensile clip that is secured to the tubing of the second pipe segment and, thus, extends out from the electrofusion material of the electrofusion midline pipe fitting into the second tubing cavity. In this manner, as will be described in more detail below, the present disclosure provides techniques that facilitate improving tensile capacity (e.g., strength) of a pipeline system in which an electrofusion pipe fitting is deployed, which, at least in some instances, may facilitate improving operational efficiency and/or operational reliability of the pipeline system, for example, at least in part by reducing the likelihood that tensile force exerted on the pipeline system causes the electrofusion pipe fitting to disconnect from a pipe segment secured thereto.

To help illustrate, an example of a pipeline system 10 is shown in FIG. 1. As depicted, the pipeline system 10 is coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
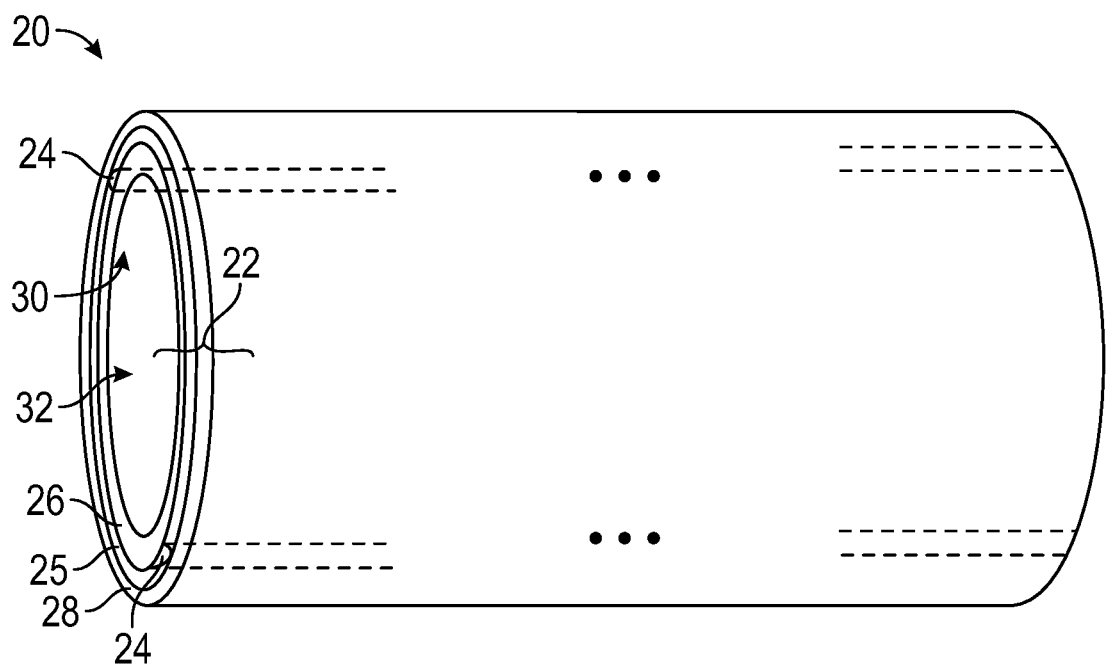
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner (e.g., innermost) barrier layer 26 and an outer (e.g., outermost) barrier layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more reinforcement (e.g., intermediate) layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally, in other embodiments, a fluid conduit 24 defined in a tubing annulus 25 of a pipe segment 20 run non-parallel to the pipe bore 32 of the pipe segment 20, for example, such that the fluid conduit 24 is skewed relative to the axial (e.g., longitudinal) extent of the pipe bore 32.

Figure 3:
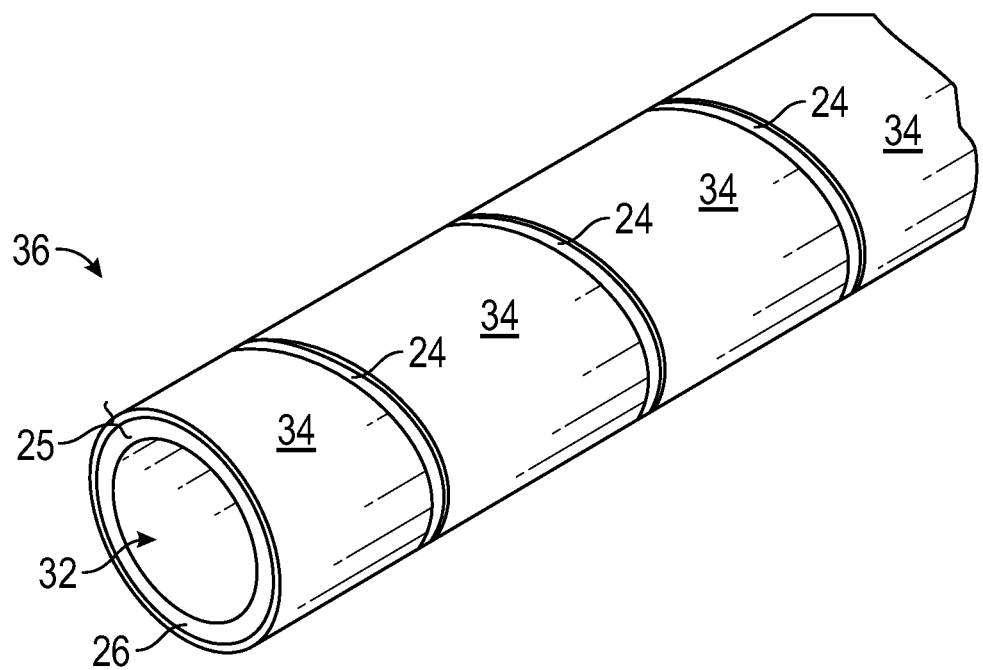
FIG. 3 is a perspective view of an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and a reinforcement (e.g., reinforcement layer) 34 included in a tubing annulus 25 of its pipe segment tubing 22, is shown in FIG. 3. In some embodiments, one or more reinforcement layers 34 of the pipe segment tubing 22 may be implemented using a solid material that has a higher tensile strength and/or a higher hoop strength as compared to a solid material used to implement the inner barrier layer 26. For example, the inner barrier layer 26 may be implemented using plastic, such as high-density polyethylene (HDPE), while a reinforcement layer 34 is implemented using composite material and/or metal, such as carbon steel, stainless steel, duplex stainless steel, super duplex stainless steel, or any combination thereof. In other words, at least in some such embodiments, a reinforcement layer 34 of the pipe segment tubing 22 may be implemented using electrically conductive, which, at least in some instances, may enable communication of electrical (e.g., test and/or return) signals via the reinforcement layer 34.

In any case, as depicted, the reinforcement layer 34 is helically disposed (e.g., wound and/or wrapped) on the inner barrier layer 26 such that gaps (e.g., openings) are left between adjacent windings to define a fluid conduit 24. In other words, in some embodiments, the reinforcement layer 34 may be implemented at least in part by winding a solid strip of material around the inner barrier layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer barrier layer 28 may be disposed directly over the depicted reinforcement layer 34 and, thus, cover and/or define (e.g., enclose) the depicted fluid conduit 24. However, in other embodiments, the tubing annulus 25 of pipe segment tubing 22 may include multiple (e.g., two, three, four, or more) reinforcement layers 34. In other words, in such embodiments, one or more other reinforcement layers 34 may be disposed over the depicted reinforcement layer 34. In fact, in some such embodiments, the one or more other reinforcement layers 34 may also each be helically disposed such that gaps are left between adjacent windings to implement one or more corresponding fluid conduits 24 in the pipe segment tubing 22.

For example, a first other reinforcement layer 34 may be helically disposed on the depicted reinforcement layer 34 using the same non-zero lay angle as the depicted reinforcement layer 34 to cover (e.g., define and/or enclose) the depicted fluid conduit 24 and to implement another fluid conduit 24 in the first other reinforcement layer 34. Additionally, a second other reinforcement layer 34 may be helically disposed on the first other reinforcement layer 34 using another non-zero lay angle, which is the inverse of the non-zero lay angle of the depicted reinforcement layer 34, to implement another fluid conduit 24 in the second other reinforcement layer 34. Furthermore, a third other reinforcement layer 34 may be helically disposed on the second other reinforcement layer 34 using the same non-zero lay angle as the second other reinforcement layer 34 to cover the other fluid conduit 24 in the second other reinforcement layer 34 and to implement another fluid conduit 24 in the third other reinforcement layer 34. In some embodiments, an outer barrier layer 28 may be disposed over the third other reinforcement layer 34 and, thus, cover (e.g., define and/or enclose) the other fluid conduit 24 in the third other reinforcement layer 34.

In any case, as described above, in some embodiments, the depicted reinforcement layer 34 may be implemented using a solid material that has a stronger tensile strength and/or a stronger hoop strength as compared to a solid material used to implement the inner barrier layer 26 and the outer barrier layer 28 of the pipe segment tubing 22. For example, the depicted reinforcement layer 34 may be implemented using metal, such as steel, while the inner barrier layer 26 and the outer barrier layer 28 are implemented using plastic, such as high-density polyethylene (HDPE). Additionally, as described above, in some embodiments, a pipe fitting 18 may be secured to the tubing 22 of a pipe segment 20 using electrofusion techniques, for example, which bond electrofusion material (e.g., plastic) implemented in the pipe fitting 18 with electrofusion material implemented in the tubing 22 of the pipe segment 20.

Figure 4:
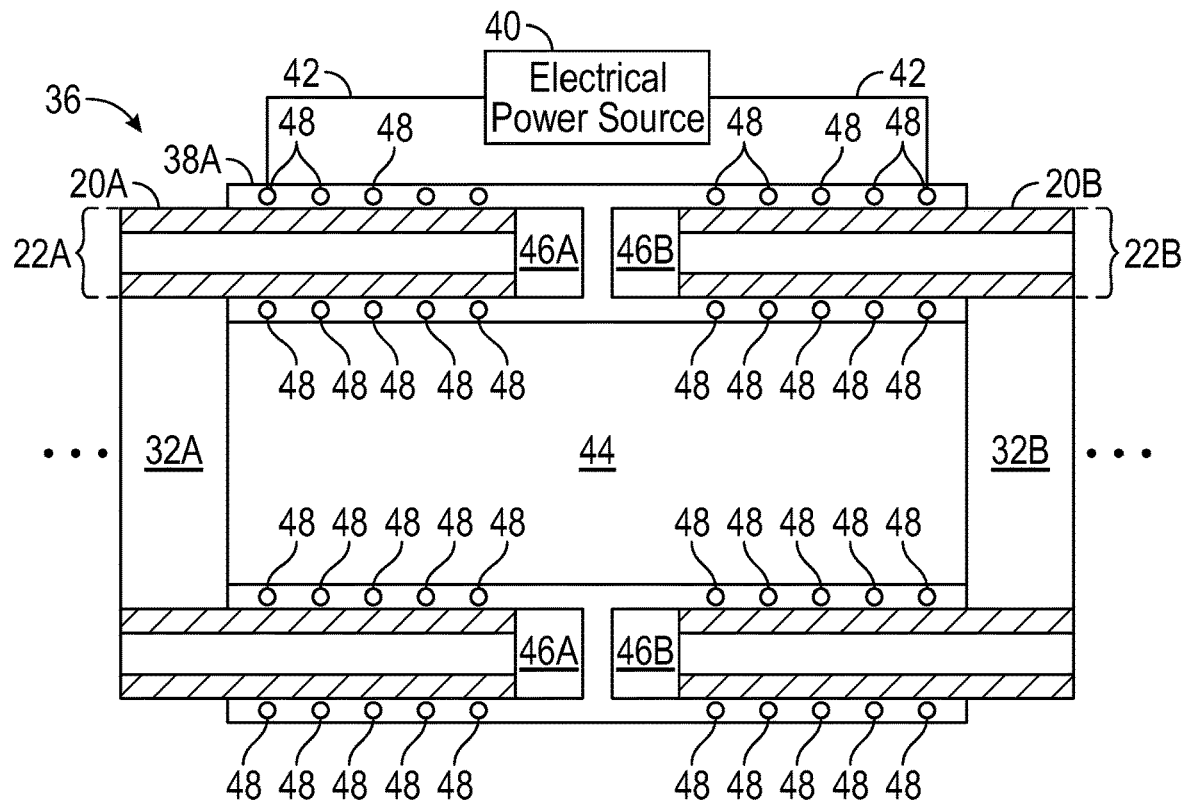
FIG. 4 is an axial cross-section profile of an example of a portion of the pipeline system of FIG. 1 that includes an electrofusion pipe fitting, which is electrically coupled to an electrical power source, and pipe segments, in accordance with an embodiment of the present disclosure.

To help illustrate, an example of a portion 36 of a pipeline system 10, which includes an electrofusion pipe fitting 38A, is shown in FIG. 4. As depicted, electrofusion material of the electrofusion pipe fitting 38A is implemented to define a fitting bore 44 through the electrofusion pipe fitting 38A, a first tubing cavity 46A, and a second tubing cavity 46B. In particular, as depicted, first tubing 22A of a first pipe segment 20A is disposed in the first tubing cavity 46A of the electrofusion pipe fitting 48A and second tubing 22B of a second pipe segment 20B is disposed in the second tubing cavity 46B of the electrofusion pipe fitting 38A to facilitate fluidly coupling a first pipe bore 32A of the first pipe segment 20A with a second pipe bore 32B of the second pipe segment 20B.

In other words, the electrofusion pipe fitting 38A of FIG. 4 may be an electrofusion midline pipe fitting 38. However, it should be appreciated that the depicted example is merely intended to be illustrative and not limiting. In particular, in other embodiments, the techniques described in the present disclosure may additionally be used to implement and/or deploy an electrofusion pipe end fitting 38.

In any case, as described above, an electrofusion pipe fitting 38 may be secured to the tubing 22 of a pipe segment 20 at least in part by bonding electrofusion material (e.g., plastic) implemented in the electrofusion pipe fitting 38 with electrofusion material implemented in the tubing 22 of the pipe segment 20. To facilitate bonding electrofusion material, as depicted, the electrofusion pipe fitting 38A includes one or more heating wires 48, which may be electrically coupled to an electrical power source 40 via one or more external wires (e.g., cables) 42. In particular, as in the depicted example, a heating wire 48 of the electrofusion pipe fitting 38A may be embedded within the electrofusion material of the electrofusion pipe 38A, for example, proximate to a tubing cavity 46 of the electrofusion pipe fitting 38A. Due to its electrical resistance, supplying electrical power to the heating wire 48 may cause it to heat up, thereby melting electrofusion material implemented in the electrofusion pipe fitting 38A such that the electrofusion material implemented in the electrofusion pipe fitting 38A bonds (e.g., fuses) with electrofusion material implemented in the tubing 22 of a pipe segment 20 disposed in a corresponding tubing cavity 46 once the heat has been removed.

In other words, to facilitate securing the electrofusion pipe fitting 38A to the first pipe segment 20A, electrofusion material adjacent the first tubing cavity 46A may be bonded with electrofusion material in the first tubing 22A of the first pipe segment 20A that is disposed in the first tubing cavity 46A. Similarly, to facilitate securing the electrofusion pipe fitting 38A to the second pipe segment 20B, electrofusion material adjacent the second tubing cavity 46B may be bonded with electrofusion material in the second tubing 22B of the second pipe segment 20B that is disposed in the second tubing cavity 46B. However, as described above, the tensile strength of a bond between electrofusion material (e.g., plastic) is generally weaker than the tensile strength of one or more reinforcement layers 34 in a pipe segment 20. In other words, at least in some instances, deploying an electrofusion pipe fitting 38 in a pipeline system 10 that relies solely on a bond between electrofusion material may limit tensile capacity (e.g., strength) of the pipeline system 10 and, thus, potentially limit operational efficiency and/or operational reliability of the pipeline system 10, for example, due to exertion of a tensile force that exceeds the tensile capacity provided by the bond between the electrofusion material resulting in the electrofusion pipe fitting 38 separating from a pipe segment 20 secured thereto.

Accordingly, to facilitate improving pipeline operational efficiency and/or operational reliability, the present disclosure provides techniques for implementing and/or deploying an electrofusion pipe fitting 38 in a pipeline system 10 to facilitate improving the tensile capacity (e.g., strength) of the pipeline system 10. In particular, to facilitate improving pipeline tensile capacity, the pipeline system 10 may be implemented to facilitate transferring tensile force exerted thereon between non-electrofusion material, such as metal, implemented in the electrofusion pipe fitting 38 and one or more reinforcement layers 34 of pipe segment tubing 22 that is secured to the electrofusion pipe fitting 38, for example, instead of solely relying on a bond between electrofusion material in the electrofusion pipe fitting 38 and electrofusion material in the pipe segment tubing 22.

Figure 5:
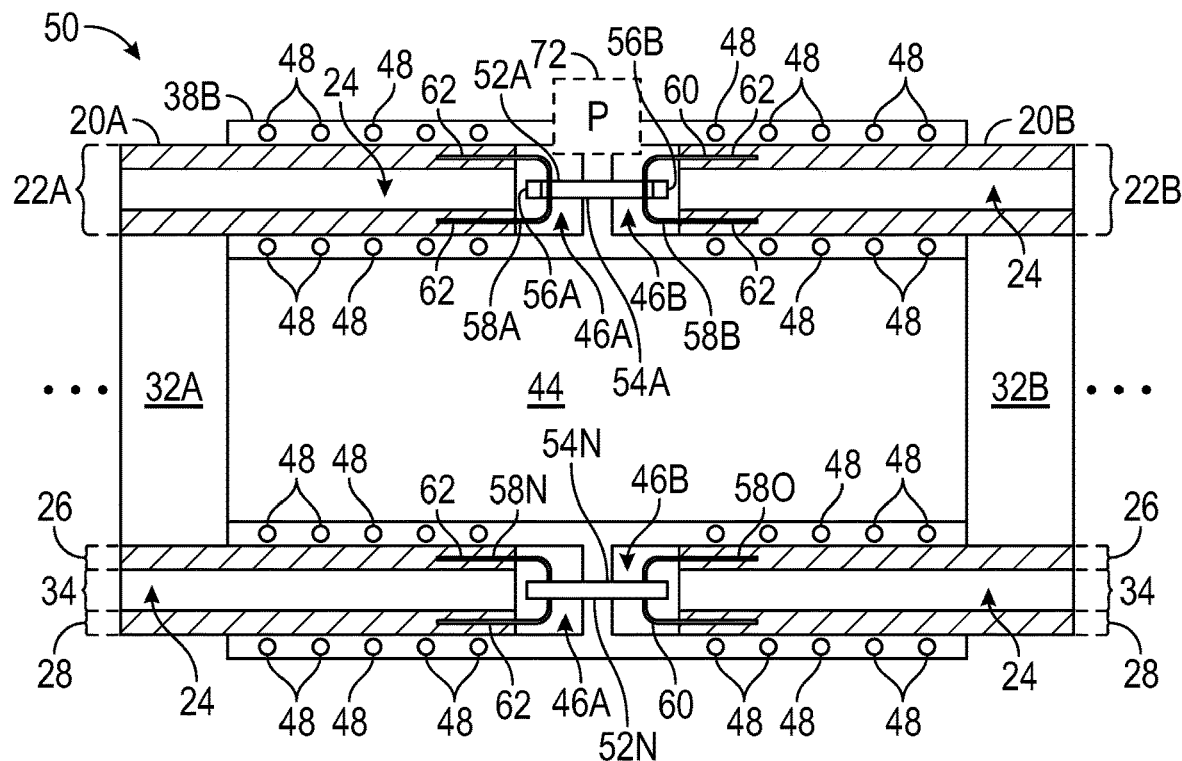
FIG. 5 is an axial cross-section profile of another example of a portion of the pipeline system of FIG. 1 that includes an electrofusion pipe fitting with tensile hooks and pipe segments with tensile clips, in accordance with an embodiment of the present disclosure.

To help illustrate, another example of a portion 50 of a pipeline system 10, which includes an electrofusion pipe fitting 38B, is shown in FIG. 5. As depicted, electrofusion material of the electrofusion pipe fitting 38B is implemented to define a fitting bore 44 through the electrofusion pipe fitting 38B, a first tubing cavity 46A, and a second tubing cavity 46B. In particular, as depicted, first tubing 22A of a first pipe segment 20A is disposed in the first tubing cavity 46A of the electrofusion pipe fitting 38A and second tubing 22B of a second pipe segment 20B is disposed in the second tubing cavity 46B of the electrofusion pipe fitting 38A to facilitate fluidly coupling a first pipe bore 32A of the first pipe segment 20A with a second pipe bore 32B of the second pipe segment 20B.

In other words, the electrofusion pipe fitting 38B of FIG. 5 may be an electrofusion midline pipe fitting 38. However, it should be appreciated that the depicted example is merely intended to be illustrative and not limiting. In particular, in other embodiments, the techniques described in the present disclosure may additionally be used to implement and/or deploy an electrofusion pipe end fitting 38.

In any case, to facilitate bonding electrofusion material, as depicted, the electrofusion pipe fitting 38B includes one or more heating wires 48. In some embodiments, the one or more heating wires 48 of FIG. 5 may generally match the one or more heating wires 48 of FIG. 4. In other words, in such embodiments, the one or more heating wires 48 of the electrofusion pipe fitting 38B may be electrically coupled to an electrical power source 40 via one or more external wires (e.g., cables) 42.

However, as depicted, the electrofusion pipe fitting 38B of FIG. 5 additionally includes tensile hooks 52—namely a first tensile hook 52A and an Nth tensile hook 52N. In particular, each tensile hook 52 includes a hook shaft 54, which is at least partially embedded in electrofusion material of the electrofusion pipe fitting 38B, and one or more hook bends 56, which each extend out from hook shaft 54 and the electrofusion material of the electrofusion pipe fitting 38B into a corresponding tubing cavity 46. More specifically, as depicted, the first tensile hook 52A includes a first hook shaft 54A, a first hook bend 56A that extends out from the first hook shaft 54A into the first tubing cavity 46A, and a second hook bend 56B that extends out from the first hook shaft 54A into the second tubing cavity 46B. Similarly, although partially obfuscated from view, the Nth tensile hook 52N includes an Nth hook shaft 54N, an Nth hook bend 56 that extends out from the Nth hook shaft 54N into the first tubing cavity 46A, and an N+1th hook bend 56 that extends out from the Nth hook shaft 54N into the second tubing cavity 46B.

Moreover, as depicted in FIG. 5, tensile clips 58 are secured to the tubing 22 of each pipe segment 20 disposed in a tubing cavity 46 of the electrofusion pipe fitting 38B. In particular, as depicted, a first tensile clip 58A and an Nth tensile clip 58N are secured to the first tubing 22A of the first pipe segment 20A. Additionally, as depicted, a second tensile clip 58B and an N+1th tensile clip 580 are secured to the second tubing 22B of the second pipe segment 20B.

More specifically, as depicted, each tensile clip 58 secured to the tubing 22 of a pipe segment 20 includes a loop end 60 and clip legs 62, which extend out from the loop end 60. As will be described in more detail below, to facilitate securing a tensile clip 58 to pipe segment tubing 22, in some embodiments, the clip legs 62 of a tensile clip 58 may be implemented to be secured in a corresponding clip opening formed in the pipe segment tubing 22, for example, via an interference (e.g., press and/or friction) fit. In other words, in such embodiments, a pipe segment 20 to be secured to an electrofusion pipe fitting 38 may be implemented at least in part by forming clip openings in its tubing 22 and securing corresponding clip legs 62 of a tensile clip 58 in the clip openings.

Figure 6:
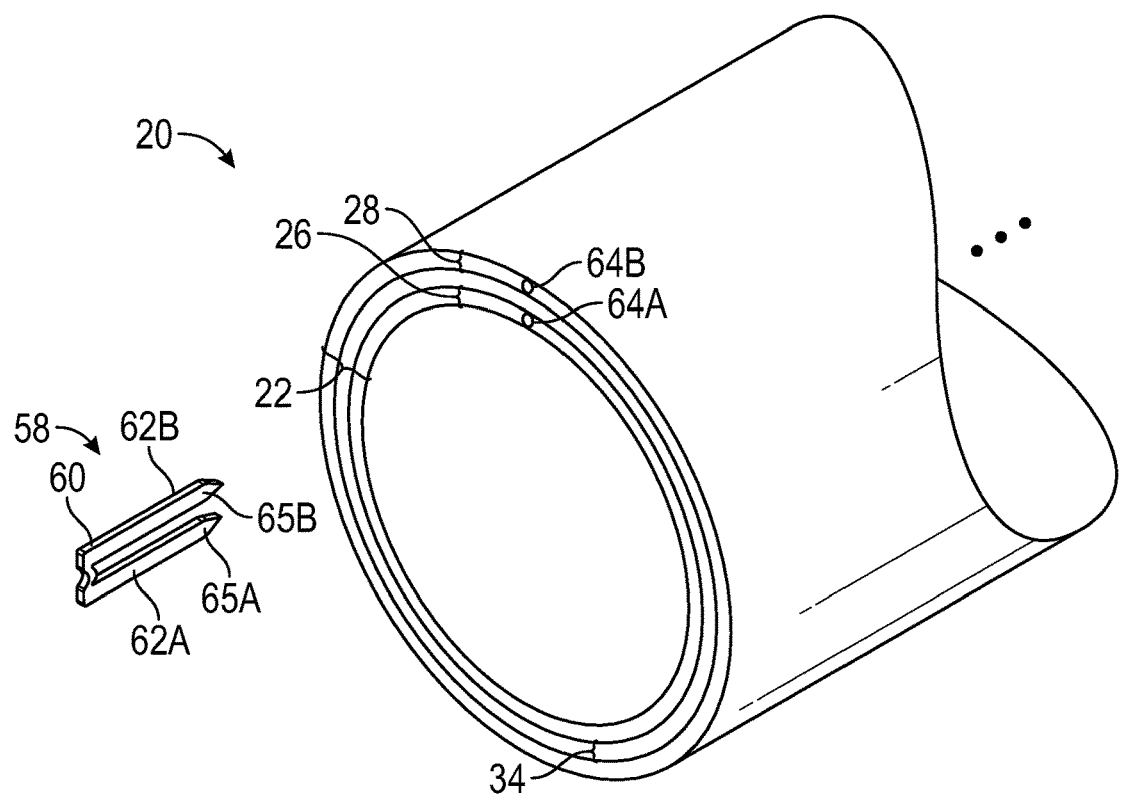
FIG. 6 is a perspective view of an example of a tensile clip and a pipe segment of FIG. 5, in accordance with an embodiment of the present disclosure.

To help illustrate, an example of a pipe segment 20, which includes tubing 22 and a tensile clip 58, is shown in FIG. 6. As depicted, clip openings 64 are implemented (e.g., formed) in the pipe segment tubing 22. In particular, a first clip opening 64A is implemented in an inner barrier layer 26 of the pipe segment tubing 22 while a second clip opening 64B is implemented in an outer barrier layer 28 of the pipe segment tubing 22.

Additionally, as depicted, the tensile clip 58 includes a loop end 60 and multiple clip legs 62—namely a first clip leg 62A, which includes a first pointed end 65A, and a second clip leg 62B, which includes a second pointed end 65B—that extend out from the loop end 60 of the tensile clip 58. In particular, the first clip leg 62A of the tensile clip 58 may be secured in the first clip opening 64A that is implemented in the inner barrier layer 26 of the pipe segment tubing 22. On the other hand, the second clip leg 62B of the tensile clip 58 may be secured in the second clip opening 64B that is implemented in the outer barrier layer 28 of the pipe segment tubing 22.

Furthermore, as described above, pipe segment tubing 22 may include one or more reinforcement layers 34 implemented between its inner barrier layer 26 and its outer barrier layer 28. In other words, when the clip legs 62 are secured in the clip openings 64, the tensile clip 58 may be secured around and, thus, grab onto the one or more reinforcement layer 34 of the pipe segment tubing 22. As such, securing the tensile clip 58 to the tubing 22 of the pipe segment 20 in this manner may facilitate transferring tensile force exerted thereon between the one or more reinforcement layers 34 of the pipe segment 20 and the tensile clip 58.

However, it should be appreciated that the depicted example is merely intended to be illustrative and not limiting. In particular, in some embodiments, multiple tensile clips 58 may be secured to the tubing 22 of a pipe segment 20 and, thus, multiple sets (e.g., pairs) of clip openings 64 may be implemented in the tubing 22 of the pipe segment 20. For example, in some such embodiments, four sets of clip openings 64 may be implemented in the tubing 22 of the pipe segment 20 such that they are ninety degrees offset when four tensile clips 58 are secured to the tubing 22 of the pipe segment 20. Additionally or alternatively, in other embodiments, a tensile clip 58 to be secured to the tubing 22 of a pipe segment 20 may be implemented with a different shape.

Figure 7:
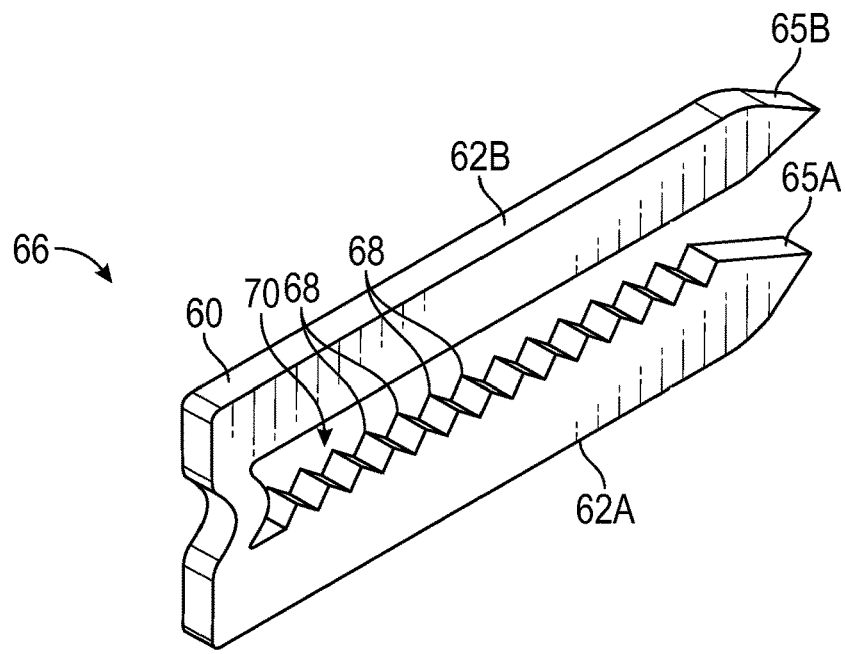
FIG. 7 is a perspective view of another example of a tensile clip of FIG. 5, which includes teeth (e.g., serrations), in accordance with an embodiment of the present disclosure.

To help illustrate, another example of a tensile clip 58—namely a serrated tensile clip 66—is shown in FIG. 7. As depicted, the serrated tensile clip 66 includes a loop end 60, a first clip leg 62A with a first pointed end 65A that extends out from the loop end 60, and a second clip leg 62B with a second point end 65B that extends out from the loop end 60. In some embodiments, the loop end 60 of the serrated tensile clip 66 in FIG. 7 may generally match the loop end 60 of the tensile clip 58 in FIG. 6 and/or the second clip leg 62B of the serrated tensile clip 66 in FIG. 7 may generally match the second clip leg 62B of the tensile clip 58 in FIG. 6.

However, as depicted in FIG. 7, the first clip leg 62A of the serrated tensile clip 66 additionally includes teeth 68 (e.g., serrations) that extend out from its inner surface 70. In some embodiments, the teeth 68 implemented on the first clip leg 62A may increase the surface area of the first clip leg 62A and, thus, facilitate increasing a contact surface area between the serrated tensile clip 66 and the tubing 22 of a pipe segment 20 to which the tensile clip 66 is secured. In other words, in such embodiments, securing the serrated tensile clip 66 to pipe segment tubing 22 may facilitate improving the strength with which the serrated tensile clip 66 is secured to the pipe segment tubing 22 and, thus at least in some instances, may facilitate improving the transfer of tensile force between one or more reinforcement layers 34 of the pipe segment tubing 22 and the serrated tensile clip 66.

In any case, returning to the portion 50 of the pipeline system 10 depicted in FIG. 5, as described above, one or more reinforcement layers 34 of a pipe segment 20 may be implemented between an inner barrier layer 26 of its tubing 22 and an outer barrier layer 28 of its tubing 22. Additionally, as described above, in some embodiments, a reinforcement layer 34 of pipe segment tubing 22 may be implemented to facilitate defining a fluid conduit 24 within the pipe segment tubing 22. Moreover, even when implemented as a continuous layer of solid material, in some instances, some amount of fluid (e.g., gas and/or liquid) may nevertheless permeate through the inner barrier layer 26 and/or the outer barrier layer 28 of the pipe segment tubing 22 into the fluid conduit 24 defined within the reinforcement layer 34.

To facilitate venting fluid present within pipe segment tubing 22 secured thereto, as in the depicted example, in some embodiments, the electrofusion pipe fitting 38B may include one or more vent (e.g., fluid) ports 72. However, it should again be appreciated that the depicted example is merely intended to be illustrative and not limiting. In particular, in other embodiments, an electrofusion pipe fitting 38 may not include a vent port 72.

In any case, as in the depicted example, a vent port 72 of the electrofusion pipe fitting 38B may be fluidly coupled to one or more tubing cavities 46 of the electrofusion pipe fitting 38B. Thus, to facilitate venting fluid present within a fluid conduit 24 defined in a reinforcement layer 34 of pipe segment tubing 22 that is secured in a tubing cavity 46 of the electrofusion pipe fitting 38B, a fluid path between the fluid conduit 24 in the reinforcement layer 34 and the vent port 72 may be provided in the tubing cavity 46. In fact, in some embodiments, a tensile clip 58 secured to the pipe segment tubing 22 may be implemented to facilitate maintaining open a fluid path between the fluid conduit 24 in the reinforcement layer 34 and the vent port 72 in the tubing cavity 46.

Figure 8:
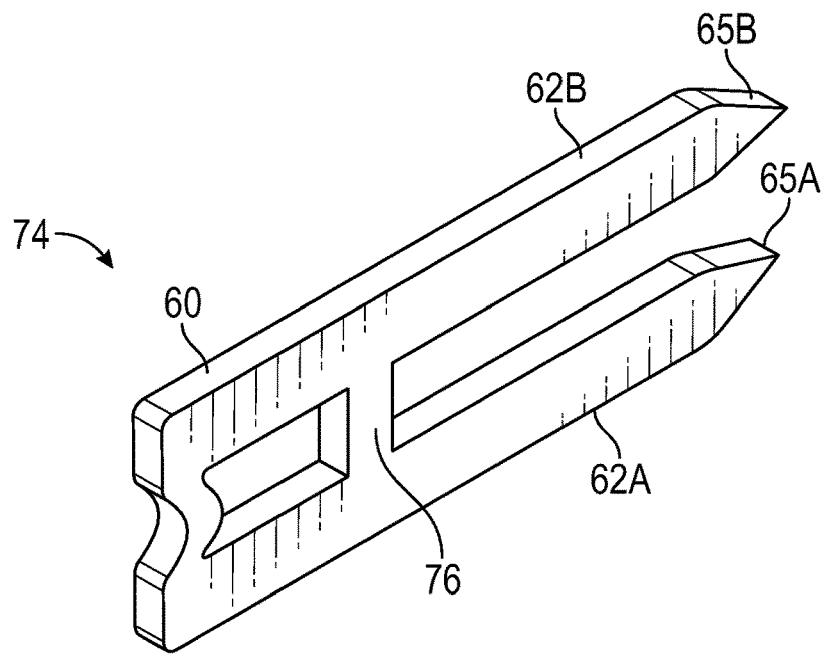
FIG. 8 is a perspective view of another example of a tensile clip of FIG. 5, which includes a guide bar, in accordance with an embodiment of the present disclosure.

To help illustrate, a further example of a tensile clip 58—namely a vent assurance tensile clip 74—is shown in FIG. 8. As depicted, the vent assurance tensile clip 74 includes a loop end 60, a first clip leg 62A with a first pointed end 65A that extends out from the loop end 60, and a second clip leg 62B with a second point end 65B that extends out from the loop end 60. In some embodiments, the loop end 60 of the vent assurance tensile clip 74 in FIG. 8 may generally match the loop end 60 of the tensile clip 58 in FIG. 6, the first clip leg 62A of the vent assurance tensile clip 74 in FIG. 8 may generally match the first clip leg 62A of the tensile clip 58 in FIG. 6, and/or the second clip leg 62B of the vent assurance tensile clip 74 in FIG. 8 may generally match the second clip leg 62B of the tensile clip 58 in FIG. 6.

However, as depicted in FIG. 8, the vent assurance tensile clip 74 additionally includes a guide bar 76 that extends between its first clip leg 62A and its second clip leg 62B. More specifically, the vent assurance tensile clip 74 may be implemented to enable the first clip leg 62A and the second clip leg 62B to be inserted into the tubing 22 of a pipe segment 20 until the guide bar 76 of the vent assurance tensile clip 74 directly abuts the tubing 22 of the pipe segment 20. In other words, due to the distance between the loop end 60 and the guide bar 76, securing the vent assurance tensile clip 74 to the pipe segment tubing 22 may facilitate maintaining clearance between the pipe segment tubing 22 and a tubing cavity 46 of an electrofusion pipe fitting 38 in which the pipe segment tubing 22 is disposed and, thus, maintaining a fluid path between a fluid conduit 24 defined in an reinforcement layer 34 of the pipe segment tubing 22 and a vent port 72 of the electrofusion pipe fitting 38.

In any case, as described above, a tensile clip 58 may be secured around and, thus, grab onto one or more reinforcement layers 34 of pipe segment tubing 22 to facilitate transferring tensile force between the one or more reinforcement layers 34 of the pipe segment tubing 22 and the tensile clip 58. In fact, in some embodiments, special-purpose deployment equipment may be implemented and/or operated to facilitate securing one or more tensile clips 58 to pipe segment tubing 22. In particular, to facilitate securing a tensile clip 58 to pipe segment tubing 22, in some such embodiments, the special-purpose deployment equipment may be implemented and/or operated to circumferentially compress the pipe segment tubing 22 around the tensile clip 58.

Figure 9:
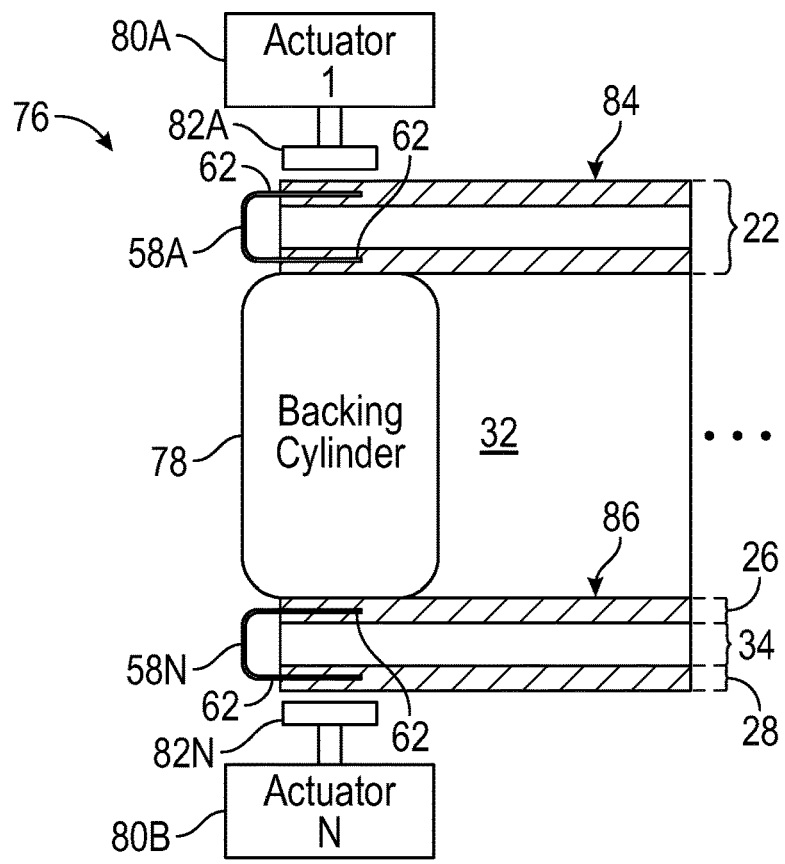
FIG. 9 is a block diagram of an example of special-purpose deployment equipment that may be implemented and/or operated to facilitate securing a tensile clip to pipe segment tubing, in accordance with an embodiment of the present disclosure.

To help illustrate, an example of special-purpose deployment equipment 76 and a pipe segment 20 is shown in FIG. 9. As depicted, the pipe segment 20 includes a first tensile clip 58A, an Nth tensile clip 58N, and tubing 22, which includes an inner barrier layer 26, an outer barrier layer 28, and one or more reinforcement layers 34. In some embodiments, the first tensile clip 58A and/or the Nth tensile clip 58N in FIG. 9 may generally match the tensile clip 58 in FIG. 6. Additionally or alternatively, the first tensile clip 58A and/or the Nth tensile clip 58N in FIG. 9 may generally match the serrated tensile clip 66 in FIG. 7. Furthermore, in some embodiments, the first tensile clip 58A and/or the Nth tensile clip 58N in FIG. 9 may generally match the vent assurance tensile clip 74 in FIG. 8.

Additionally, as depicted, the special-purpose deployment equipment 76 includes a backing cylinder 78 and actuators 80, which each include an actuator piston (e.g., arm) 82. In particular, the special-purpose deployment equipment 76 includes a first actuator 80A, which includes a first actuator piston 82A, and an Nth actuator 80N, which includes an Nth actuator piston 82N. Furthermore, in some embodiments, the actuators 80 of the special-purpose deployment equipment 76 may include one or more hydraulic actuators 80 and/or one or more pneumatic actuators 80.

However, it should be appreciated that the depicted example is merely intended to be illustrative and not limiting. In particular, although multiple actuators 80 are depicted, in other embodiments, special-purpose deployment equipment 76 may include a single actuator 80. Additionally or alternatively, in some embodiments, special-purpose deployment equipment 76 may include additional components, such as a control system that is implemented and/or operated to generally control operation of the special-purpose deployment equipment 76. Moreover, in other embodiments, other types of special-purpose deployment equipment 76, such as a swage machine, may be implemented and/or operated to facilitate securing a tensile clip 58 to the tubing 22 of a pipe segment 20.

In any case, as depicted, the backing cylinder 78 of the special-purpose deployment equipment 76 is implemented to be at least partially inserted into the pipe bore 32 of the pipe segment 20. In some embodiments, the backing cylinder 78 may be a solid cylinder. However, in other embodiments, the backing cylinder 78 may be a ring, for example, to facilitate reducing weight and, thus, improving deployment efficiency of the special-purpose deployment equipment 76.

Furthermore, as depicted, the actuators 80 of the special-purpose deployment equipment 76 are implemented such that their actuator pistons 82 are oriented toward the backing cylinder 78 (e.g., inwardly). As such, when the tubing 22 of the pipe segment 20 is disposed between the actuator pistons 82 and the backing cylinder 78, the actuators 80 of the special-purpose deployment equipment 76 may be operated to circumferentially compress the tubing 22 around the clip legs 62 of the tensile clips 58, for example, to facilitate producing via interference (e.g., press and/or friction) fits that facilitate securing the tensile clips 58 to the tubing 22 of the pipe segment 20. In particular, circumferentially compressing the pipe segment tubing 22 around the clip legs 62 of a tensile clip 58 may facilitate compressing the clip legs 62 toward one or more reinforcement layers 34 of the pipe segment tubing 22 and, thus, facilitate securing the tensile clip 58 to the pipe segment tubing 22 such that the tensile clip 58 grabs onto the one or more reinforcement layers 34 of the pipe segment tubing 22.

In any case, as described above, pipe segment tubing 22 may be secured in a tubing cavity 46 of an electrofusion pipe fitting 38 at least in part by bonding electrofusion material (e.g., plastic) in the electrofusion pipe fitting 38 with electrofusion material in the pipe segment tubing 22. In particular, to facilitate bonding the electrofusion material, the electrofusion material of the pipe segment tubing 22 may be in close proximity (e.g., adjacent) to the electrofusion material in the tubing cavity 46 of the electrofusion pipe fitting 38. In other words, to facilitate securing the pipe segment tubing 22 in the tubing cavity 46 of the electrofusion pipe fitting 38, the pipe segment tubing 22 may be appropriately sized for the tubing cavity 46, for example, such that an outer surface diameter of the pipe segment tubing 22 is slightly less than an inward-facing surface diameter of the tubing cavity 46 and/or an inner surface diameter of the pipe segment tubing 22 is slightly greater than an outward-facing surface diameter of the tubing cavity 46.

However, at least in some instances, a default (e.g., original and/or uncompressed) size of the tubing 22 of a pipe segment 20 may not be appropriate for securement in a tubing cavity 46 of an electrofusion pipe fitting 38. Thus, to facilitate securement in the tubing cavity 46, the size of the pipe segment tubing 22 may be adjusted from its default size. For example, the size of the pipe segment tubing 22 may be adjusted at least in part by removing (e.g., shaving) material from an outer surface 84 of the pipe segment tubing 22 and/or from an inner surface 86 of the pipe segment tubing 22.

Additionally or alternatively, since used to circumferentially compress pipe segment tubing 22, in some embodiments, the special-purpose deployment equipment 76 may be implemented and/or operated to facilitate appropriately adjusting the size of the pipe segment tubing 22 from its default size for securement in a tubing cavity 46 of an electrofusion pipe fitting 38. In particular, in such embodiments, the actuators 80 of the special-purpose deployment equipment 76 may be operated to circumferentially compress the pipe segment tubing 22 to facilitate reducing the outer surface diameter of the pipe segment tubing 22 and/or to facilitate increasing the inner surface diameter of the pipe segment tubing 22. In this manner, special-purpose deployment equipment 76 may be implemented and/or operated to facilitate securing tubing 22 of a pipe segment 20 to an electrofusion pipe fitting 38, for example, at least in part by facilitating an adjustment to a default size of the tubing 22 and/or securement of one or more tensile clips 58 to the tubing 22 of the pipe segment 20.

Returning to the portion 50 of the pipeline system 10 depicted in FIG. 5, as described above, securing a tensile clip 58 to the tubing 22 of a pipe segment 20 such that the tensile clip 58 grabs onto one or more reinforcement layers 34 of the tubing 22 may facilitate transferring tensile force exerted on the pipeline system 10 between the one or more reinforcement layers 34 of the tubing 22 and the tensile clip 58 secured to the tubing 22. Additionally, as described above, to facilitate improving its tensile capacity (e.g., strength), a pipeline system 10 that includes an electrofusion pipe fitting 38 may be implemented to facilitate transferring tensile force exerted thereon between non-electrofusion material, for example, instead of relying solely on a bond between electrofusion material (e.g., plastic) in the electrofusion pipe fitting 38 and electrofusion material in the tubing 22 of the pipe segment 20. Furthermore, as described above, a tensile clip 58 secured to pipe segment tubing 22 and a tensile hook 52 in the electrofusion pipe fitting 38 may be implemented using non-electrofusion material, such as metal.

To facilitate transferring tensile force therebetween, as in the depicted example, one or more hook bends 56 of a tensile hook 52 in the electrofusion pipe fitting 38B may be matingly interlocked (e.g., engaged and/or interfaced) with a loop end 60 of a tensile clip 58. In particular, the first hook bend 56A of the first tensile hook 52A is matingly interlocked with the loop end 60 of the first tensile clip 58A, which is secured to the first tubing 22A of the first pipe segment 20A, and, thus, may facilitate transferring tensile force between one or more reinforcement layers 34 of the first pipe segment 20A and the electrofusion pipe fitting 38B. Additionally, a second hook bend 56B of the first tensile hook 52A is matingly interlocked with the loop end 60 of the second tensile clip 58B, which is secured to the second tubing 22B of the second pipe segment 20B, and, thus, may facilitate transferring tensile force between one or more reinforcement layers 34 of the second pipe segment 20B and the electrofusion pipe fitting 38B. In fact, at least in some instances, implementing the first tensile hook 52A in this manner may facilitate transferring tensile force between non-electrofusion material (e.g., one or more tensile clips 58 and one or more reinforcement layers 34) of the first pipe segment 20A and non-electrofusion material (e.g., one or more tensile clips 58 and one or more reinforcement layers 34) of the second pipe segment 20B via the first hook shaft 54A of the first tensile hook 52A.

Although obfuscated from view, as described above, the Nth tensile hook 52N of the electrofusion pipe fitting 38B includes an Nth hook bend 56 and an N+1th hook bend 56. In particular, the Nth hook bend 56 of the Nth tensile hook 52N may be matingly interlocked with the loop end 60 of the Nth tensile clip 58N, which is secured to the first tubing 22A of the first pipe segment 20A, and, thus, may facilitate transferring tensile force between one or more reinforcement layers 34 of the first pipe segment 20A and the electrofusion pipe fitting 38B. Additionally, the N+1th hook bend 56 of the N+1th tensile hook 52N may be matingly interlocked with the loop end 60 of the N+1th tensile clip 580, which is secured to the second tubing 22B of the second pipe segment 20B, and, thus, may facilitate transferring tensile force between one or more reinforcement layers 34 of the second pipe segment 20B and the electrofusion pipe fitting 38B. In fact, at least in some instances, implementing the Nth tensile hook 52N in this manner may facilitate transferring tensile force between non-electrofusion material (e.g., one or more tensile clips 58 and one or more reinforcement layers 34) of the first pipe segment 20A and non-electrofusion material (e.g., one or more tensile clips 58 and one or more reinforcement layers 34) of the second pipe segment 20B via the Nth hook shaft 54N of the Nth tensile hook 52N.

However, it should be appreciated that the depicted example is merely intended to be illustrative and not limiting. In particular, in other embodiments, an electrofusion pipe fitting 38 may include a tensile loop instead of a tensile hook 52, for example, which includes a spring-loaded gate. In fact, to facilitate transferring tensile force between pipe segment tubing 22 and an electrofusion pipe fitting 28, in some such embodiments, a tensile hook 52, which includes a hook bend 56 that is implemented to matingly interlock with the tensile loop of the electrofusion pipe fitting 38, may be secured to an outer barrier layer 28 of the pipe segment tubing 22 and another tensile hook 52, which includes another hook bend 56 that is implemented to matingly interlock with the tensile loop of the electrofusion pipe fitting 38, may be secured to an inner barrier layer 28 of the pipe segment tubing 22 instead of a tensile clip 58, for example, such that the hook shafts 54 of the tensile hooks 52 are secured around and, thus, grab onto one or more reinforcement layers 34 of the pipe segment tubing 22.

In any case, as depicted, the first hook bend 56A and the second hook bend 56B of the first tensile hook 52A are oriented in a first direction (e.g., out of the page). On the other hand, although obfuscated from view, the Nth hook bend 56 and the N+1th hook bend 56 of the Nth tensile hook 52N are oriented in a second (e.g., opposite and/or different) direction (e.g., into the page). In other words, rotating the electrofusion pipe fitting 38B relative to the first pipe segment 20A may cause the first hook bend 56A of the first tensile hook 52A to matingly interlock with the loop end 60 of the first tensile clip 58A, which is secured to the first tubing 22A of the first pipe segment 20A, and the Nth hook bend 56 of the Nth tensile hook 52N to matingly interlock with the loop end 60 of the Nth tensile clip 58N, which is secured to the first tubing 22A of the first pipe segment 20A. Similarly, rotating the electrofusion pipe fitting 38B relative to the second pipe segment 20B may cause the second hook bend 56B of the first tensile hook 52A to matingly interlock with the loop end 60 of the second tensile clip 58B, which is secured to the second tubing 22B of the second pipe segment 20B, and the N+1th hook bend 56 of the Nth tensile hook 52N to matingly interlock with the loop end of the N+1th tensile clip 580, which is secured to the second tubing 22B of the second pipe segment 20B. In other words, in some embodiments, an electrofusion pipe fitting 38 may be implemented such that the hook bends 56 of its tensile hooks 52 are oriented circumferentially within one or more of its tubing cavities 46.

Figure 10:
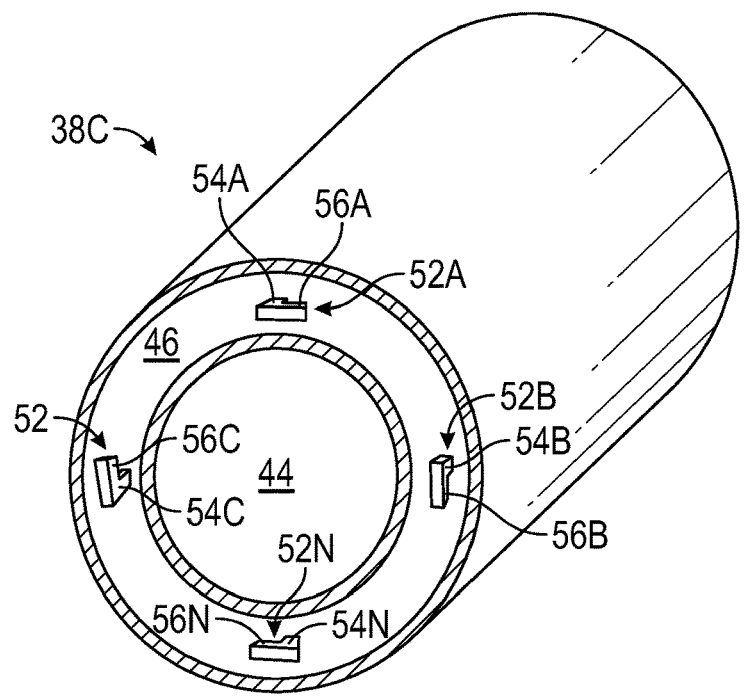
FIG. 10 is an axial view of an example of the electrofusion pipe fitting of FIG. 5, in accordance with an embodiment of the present disclosure.

To help illustrate, an example of an electrofusion pipe fitting 38C, which is implemented to define a fitting bore 44 and a tubing cavity 46, is shown in FIG. 10. As depicted, the electrofusion pipe fitting 38C includes multiple tensile hooks 52 that extend into the tubing cavity 46. In particular, as depicted, the electrofusion pipe fitting 38C includes a first tensile hook 52A, a second tensile hook 52B, a third tensile hook 52C, and an Nth (e.g., fourth) tensile hook 52N. In some embodiments, the depicted tensile hooks 52 may be ninety-degrees offset from one another.

However, it should be appreciated that the depicted example is merely intended to be illustrative and not limiting. In particular, in other embodiments, an electrofusion pipe fitting 38 may include fewer than four (e.g., one, two, or three) tensile hooks 52 that extend into a tubing cavity 46, for example, when pipe segment tubing 22 to be secured in the tubing cavity 46 includes fewer than four tensile clips 58 secured thereto. Additionally, in other embodiments, an electrofusion pipe fitting 38 may include more than four (e.g., five, six, seven, eight, or more) tensile hooks 52 that extend into a tubing cavity 46, for example, when pipe segment tubing 22 to be secured in the tubing cavity 46 includes more than four tensile clips 58 secured thereto.

In any case, as depicted, each tensile hook 52 includes a hook shaft 54 and a hook bend 56. In particular, the first tensile hook 52A includes a first hook shaft 54A and a first hook bend 56A, which extends out from the first hook shaft 54A in a direction that circumferentially follows the tubing cavity 46. Similarly, the second tensile hook 52B includes a second hook shaft 54B and a second hook bend 56B that extends out from the second hook shaft 54B in a direction that circumferentially follows the tubing cavity 46, the third tensile hook 52C includes a third hook shaft 54C and a third hook bend 56C that extends out from the third hook shaft 54C in a direction that circumferentially follows the tubing cavity 46, and the Nth tensile hook 52N includes an Nth (e.g., fourth) hook shaft 54N and an Nth (e.g., fourth) hook bend 56N that extends out from the Nth hook shaft 54N in a direction that circumferentially follows the tubing cavity 46.

As such, to facilitate securing a pipe segment 20 to the electrofusion pipe fitting 38C, the tubing 22 of the pipe segment 20 may be inserted into the tubing cavity 46 such that the loop end 60 of each tensile clip 58 secured to the tubing 22 is present between the hook bend 56 of a corresponding tensile hook 52 and the hook shaft 54 of an adjacent tensile hook 52. For example, the pipe segment tubing 22 may be inserted into the tubing cavity 46 such that the loop end 60 of a first tensile clip 58A, which is secured to the pipe segment tubing 22, is present between the first hook bend 56A of the first tensile hook 52A and the second hook shaft 54B of the second tensile hook 52A. Additionally or alternatively, the pipe segment tubing 22 may be inserted into the tubing cavity 46 such that the loop end 60 of an Nth tensile clip 58N, which is secured to the pipe segment tubing 22, is present between the Nth hook bend 56N of the Nth tensile hook 52N and the third hook shaft 54C of the third tensile hook 52C.

As such, subsequently rotating the electrofusion pipe fitting 38C relative to a pipe segment 20 inserted into its tubing cavity 46 may cause a hook bend 56 of a tensile hook 52 in the electrofusion pipe fitting 38C to matingly interlock with the loop end 60 of a corresponding tensile clip 58 that is secured to the tubing 22 of the pipe segment 20 and, thus, facilitate securing the pipe segment 20 in the tubing cavity 46 of the electrofusion pipe fitting 38C. For example, rotating the electrofusion pipe fitting 38C relative to the pipe segment 20 may cause the first hook bend 56A of the first tensile hook 52A to matingly interlock with the loop end 60 of the first tensile clip 58A that is secured to the tubing 22 of the pipe segment 20. Additionally or alternatively, rotating the electrofusion pipe fitting 38C relative to the pipe segment 20 may cause the Nth hook bend 56N of the Nth tensile hook 52N to matingly interlock with the loop end 60 of the Nth tensile clip 58N that is secured to the tubing 22 of the pipe segment 20.

Moreover, as described above, in some embodiments, an electrofusion pipe fitting 38 may include multiple tubing cavities 46, for example, when the electrofusion pipe fitting 38 is an electrofusion midline pipe fitting 38. In other words, in such embodiments, the depicted electrofusion pipe fitting 38C may include another tubing cavity 46 in addition to the depicted tubing cavity 46. In fact, in some such embodiments, the other tubing cavity 46 of the electrofusion pipe fitting 38C may be a mirror image of the depicted tubing cavity 46, for example, to enable the same rotation of the electrofusion pipe fitting 38C to simultaneously interlock a tensile hook 52 of the electrofusion pipe fitting 38C with a tensile clip 58, which is secured to pipe segment tubing 22 that is disposed within the depicted tubing cavity 46, as well as another tensile clip 58, which is secured to other pipe segment tubing 22 that is disposed within the other tubing cavity 46 of the electrofusion pipe fitting 38C.

In any case, as described above, matingly interlocking a tensile hook 52 of an electrofusion pipe fitting 38 with a tensile clip 58 of a pipe segment 20 may facilitate transferring tensile force between the electrofusion pipe fitting 38 and the pipe segment 20 via non-electrofusion material. Additionally, as described above, the tensile clip 58 may be secured to the tubing 22 of the pipe segment 20 to facilitate transferring tensile force between one or more reinforcement layers 34 of the tubing 22 and the electrofusion pipe fitting 38 via non-electrofusion material. In other words, in this manner, the present disclosure provides techniques for implementing a pipeline system 10 that includes an electrofusion pipe fitting 38 to facilitate improving the tensile strength capacity (e.g., strength) of the pipeline system 10.

Figure 11:
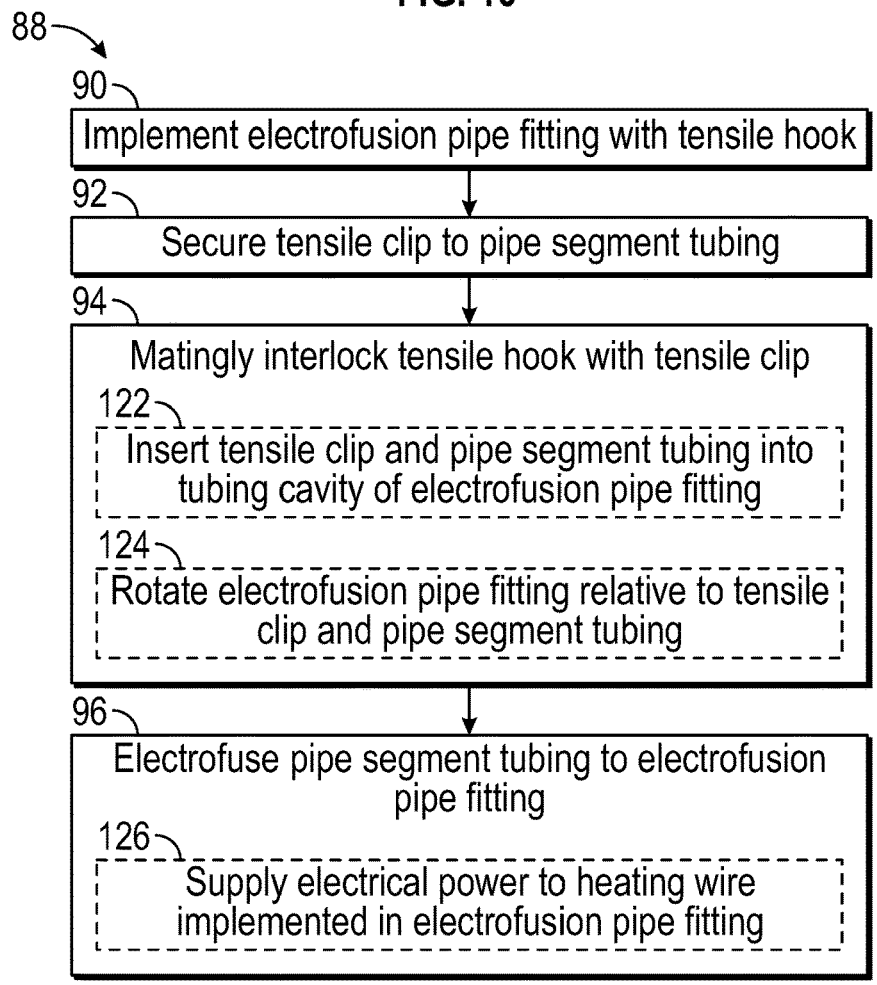
FIG. 11 is an example of a process for implementing a pipeline system that includes an electrofusion pipe fitting, in accordance with an embodiment of the present disclosure.

To help further illustrate, an example of a process 88 for implementing a pipeline system 10 with an electrofusion pipe fitting 38 is described in FIG. 11. Generally, the process 88 includes implementing an electrofusion pipe fitting with a tensile hook (process block 90) and securing a tensile clip to pipe segment tubing (process block 92). Additionally, the process 88 generally includes matingly interlocking the tensile hook with the tensile clip (process block 94) and electrofusing the pipe segment tubing to the electrofusion pipe fitting (process block 96).

Although described in a specific order, which corresponds with an embodiment of the present disclosure, it should be appreciated that the example process 88 is merely intended to be illustrative and non-limiting. In particular, in other embodiments, a process 88 for implementing a pipeline system 10 with an electrofusion pipe fitting 38 may include one or more additional process blocks and/or omit one or more of the depicted process blocks. Additionally or alternatively, in other embodiments, one or more of the depicted process blocks may be performed in a different order, for example, such that the tensile clip 58 is secured to the pipe segment tubing 22 before the electrofusion pipe fitting 38 is implemented.

In any case, as described above, to facilitate improving tensile strength of a pipeline system 10, an electrofusion pipe fitting 38 to be deployed in the pipeline system 10 may be implemented to include one or more tensile hooks 52. In other words, implementing the pipeline system 10 may include implementing an electrofusion pipe fitting 38 with one or more tensile hooks 52 (process block 90). In particular, as described above, a tensile hook 52 may be implemented such that it is partially embedded within electrofusion material of the electrofusion pipe fitting 38 and extends out from the electrofusion material into one or more tubing cavities 46 of the electrofusion pipe fitting 38.

Figure 12:
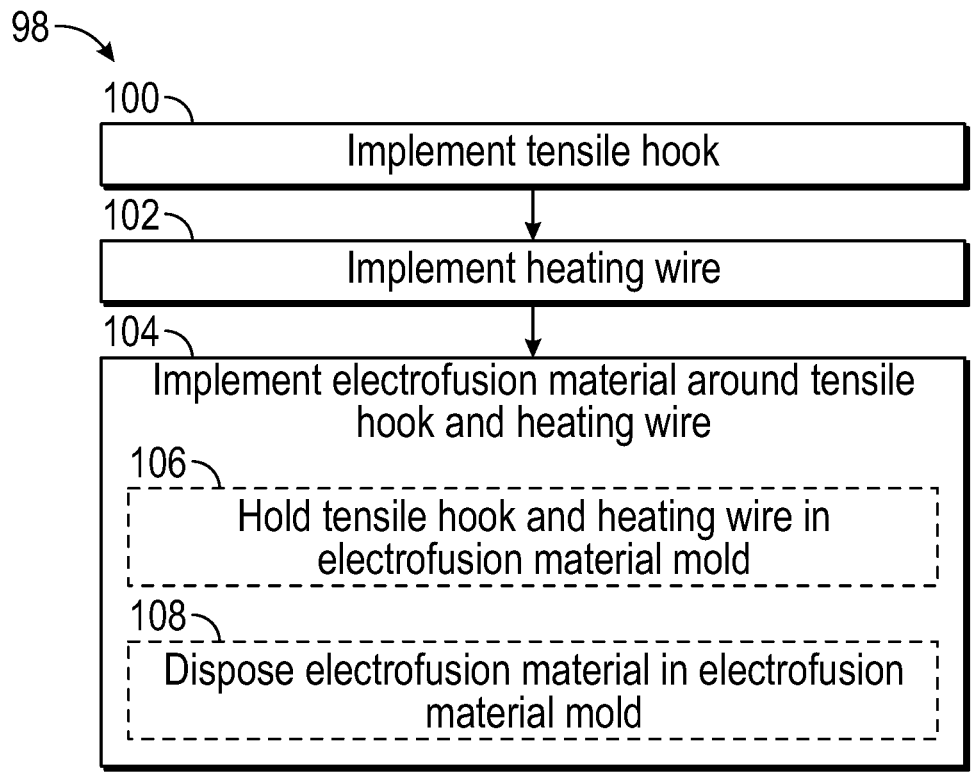
FIG. 12 is an example of a process for implementing an electrofusion pipe fitting with a tensile hook, in accordance with an embodiment of the present disclosure.

To help further illustrate, an example of a process 98 for implementing an electrofusion pipe fitting 38 with a tensile hook 52 is described in FIG. 12. Generally, the process 98 includes implementing a tensile hook (process block 100) and implementing a heating wire (process block 102). Additionally, the process 98 includes implementing electrofusion material around the tensile hook and the heating wire (process block 104).

Although described in a specific order, which corresponds with an embodiment of the present disclosure, it should be appreciated that the example process 98 is merely intended to be illustrative and non-limiting. In particular, in other embodiments, a process 98 for implementing an electrofusion pipe fitting 38 with a tensile hook 52 may include one or more additional process blocks and/or omit one or more of the depicted process blocks. Additionally or alternatively, in other embodiments, one or more of the depicted process blocks may be performed in a different order, for example, such that the heating wire 48 is implemented before the tensile hook 52.

In any case, as described above, to facilitate improving tensile strength (e.g., capacity) of a pipeline system 10 in which it is deployed, an electrofusion pipe fitting 38 may be implemented to include one or more tensile hooks 52. As such, implementing the electrofusion pipe fitting 38 may include implementing one or more tensile hooks 52 (process block 100). In particular, as described above, a tensile hook 52 of the electrofusion pipe fitting 38 may be implemented to include a hook shaft 54 and one or more hook bends 56 that extend out from the hook shaft 54. Additionally, as described above, the tensile hook 52 may be implemented using non-electrofusion material, such as metal.

Furthermore, as described above, to facilitate bonding electrofusion material (e.g., plastic) of an electrofusion pipe fitting 38 with electrofusion material of pipe segment tubing 22, the electrofusion pipe fitting 38 may include one or more heating wires 48, for example, which may be electrically coupled to an electrical power source 40 via one or more external wires (e.g., cables) 42. As such, implementing the electrofusion pipe fitting 38 may include implementing one or more heating wires 48 (process block 102). In particular, a heating wire 48 of the electrofusion pipe fitting 38 may be implemented with an electrically conductive material, such as metal, that produces heat when electrical power is supplied thereto.

Electrofusion material may then be implemented around the one or more tensile hooks 52 and the one or more heating wires 48 (process block 104). In particular, as described above, the electrofusion material of the electrofusion pipe fitting 38 may be implemented to define a fitting bore 44 as well as one or more tubing cavities 46. Additionally, as described above, a heating wire 48 may be embedded within the electrofusion material of the electrofusion pipe fitting 38 and a tensile hook 52 may include a hook shaft 54, which is embedded within the electrofusion material of the electrofusion pipe fitting 38, and one or more hook bends 56, which each extend out from the hook shaft 54 within a corresponding tubing cavity 46. Furthermore, in some embodiments, the electrofusion material of the electrofusion pipe fitting 38 may include one or more types of plastic, such as high-density polyethylene (HDPE) and/or raised temperature polyethylene (PE-RT).

Moreover, in some embodiments, the electrofusion material of the electrofusion pipe fitting 38 may be implemented around the one or more tensile hooks 52 and the one or more heating wires 48 using an electrofusion material (e.g., plastic) mold. In particular, in some such embodiments, the electrofusion material may be implemented around the one or more tensile hooks 52 and the one or more heating wires 48 at least in part by holding the one or more tensile hooks 52 and the one or more heating wires 48 at corresponding target positions in the electrofusion material mold (process block 106) and, subsequently, disposing (e.g., pouring) electrofusion material in the electrofusion material mold (process block 108). In this manner, an electrofusion pipe fitting 38 with one or more tensile hooks 52 may be implemented.

Returning to the process 88 of FIG. 11, to facilitate transferring tensile force between the electrofusion pipe fitting 38 and the tubing 22 of a pipe segment 20 via non-electrofusion material (e.g., metal), as described above, one or more tensile clips 58 may be secured to the tubing 22 of the pipe segment 20 (process block 92). In particular, as described above, a tensile clip 58 secured to the tubing 22 of the pipe segment 20 may be implemented with non-electrofusion material, such as metal. Additionally, as described above, the tensile clip 58 may be secured around and, thus, grab onto one or more reinforcement layers 34 of the pipe segment tubing 22, which are implemented using non-electrofusion material.

Figure 13:
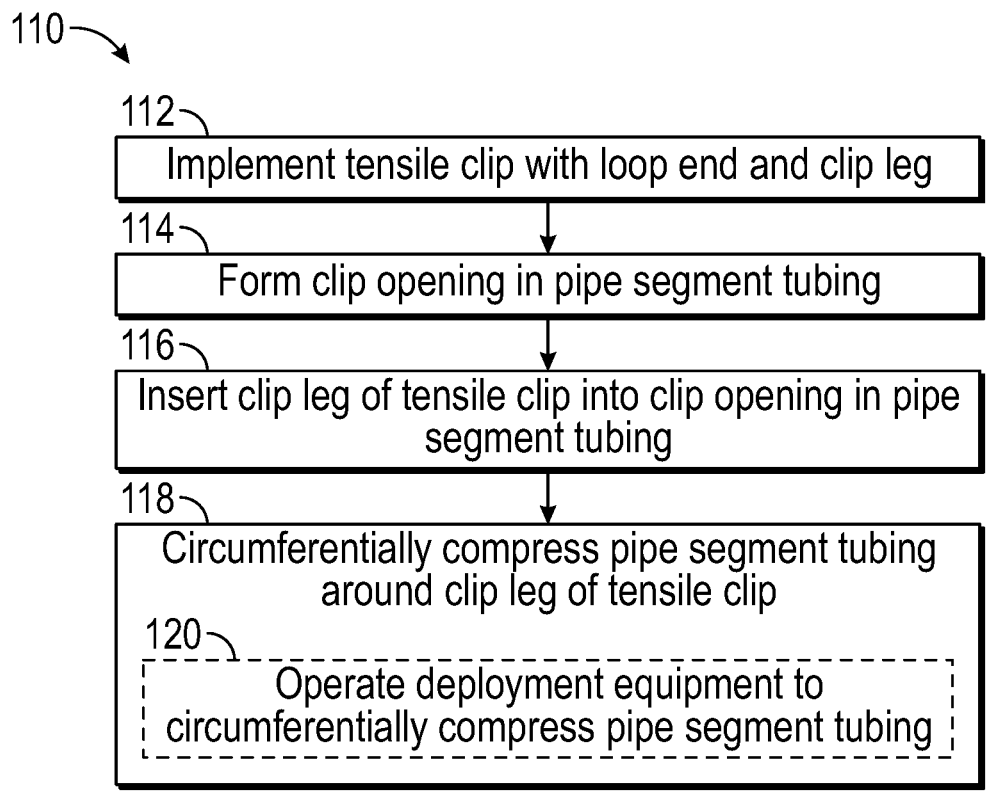
FIG. 13 is an example of a process for securing a tensile clip to pipe segment tubing, in accordance with an embodiment of the present disclosure.

To help further illustrate, an example of a process 110 for securing a tensile clip 58 to pipe segment tubing 22 is described in FIG. 13. Generally, the process 110 includes implementing a tensile clip with a loop end and a clip leg (process block 112) and forming a clip opening in pipe segment tubing (process block 114). Additionally, the process 110 generally includes inserting the clip leg of the tensile clip into the clip opening in the pipe segment tubing (process block 116) and circumferentially compressing the pipe segment tubing around the clip leg of the tensile clip (process block 118).

Although described in a specific order, which corresponds with an embodiment of the present disclosure, it should be appreciated that the example process 110 is merely intended to be illustrative and non-limiting. In particular, in other embodiments, a process 110 for securing a tensile clip 58 to pipe segment tubing 22 may include one or more additional process blocks and/or omit one or more of the depicted process blocks. Additionally or alternatively, in other embodiments, one or more of the depicted process blocks may be performed in a different order, for example, such that the clip opening 64 is formed in the pipe segment tubing 22 before the tensile clip 58 is implemented.

In any case, as described above, a tensile clip 58 to be secured to the tubing 22 of a pipe segment 20 may be implemented to include a loop end 60 and one or more clip legs 62. In other words, securing a tensile clip 58 to pipe segment tubing 22 may include implementing the tensile clip 58 to include a loop end 60 and one or more clip legs 62 (process block 112). In particular, as described above, the tensile clip 58 may be implemented with non-electrofusion material, such as carbon steel, stainless steel, duplex stainless steel, super duplex stainless steel, and/or another type of metal.

Additionally, as described above, in some embodiments, the tensile clip 58 to be secured to the tubing 22 of the pipe segment 20 may be implemented to generally match the tensile clip 58 of FIG. 6. In other embodiments, the tensile clip 58 to be secured to the tubing 22 of the pipe segment 20 may be implemented to generally match the serrated tensile clip 66 of FIG. 7. In still further embodiments, the tensile clip 58 to be secured to the tubing 22 of the pipe segment 20 may be implemented to generally match the vent assurance tensile clip 74 of FIG. 8.

In any case, as described above, a tensile clip 58 may be secured to pipe segment tubing 22 at least in part by securing a clip leg 62 of the tensile clip 58 in a clip opening 64 formed in the pipe segment tubing 22. As such, to facilitate securing the tensile clip 58 to the pipe segment tubing 22, one or more clip openings 64 may be formed (e.g., drilled) in the pipe segment tubing 22 (process block 114) and one or more corresponding clip legs 62 of the tensile clip 58 may be inserted into the one or more clip openings 64 (process block 116). For example, a first clip opening 64A may be implemented in the inner barrier layer 26 of the pipe segment tubing 22, a first clip leg 62A of the tensile clip 58 may be inserted into the first clip opening 64A, a second clip opening 64B may be implemented in the outer barrier layer 28 of the pipe segment tubing 22, and a second clip leg 62B of the tensile clip 58 may be inserted into the second clip opening 64B.

The pipe segment tubing 22 may then be circumferentially compressed around one or more clip legs 62 of the tensile clip 58 to facilitate securing the tensile clip 58 to the pipe segment tubing 22, for example, to facilitate producing an interference (e.g., press and/or friction) fit between the pipe segment tubing 22 and the one or more clip legs 62 of the tensile clip 58 (process block 118). In fact, as described above, in some embodiments, special-purpose deployment equipment 76 may be implemented and/or operated to circumferentially compress pipe segment tubing 22 (process block 120). In particular, in such embodiments, a backing cylinder 78 of the special-purpose deployment equipment 76 may be inserted into a pipe bore 32 defined by the pipe segment tubing 22 and one or more actuators 80 of the special-purpose deployment equipment 76 may be operated to drive their actuator pistons 82 toward the backing cylinder 78, thereby circumferentially compressing the pipe segment tubing 22 between the backing cylinder 78 and the actuator pistons 82 of the special-purpose deployment equipment 76. In this manner, one or more tensile clips 58 may be secured to the tubing 22 of a pipe segment 20.

Returning to the process 88 of FIG. 11, the one or more tensile clips 58 secured to the pipe segment tubing 22 may then be matingly interlocked with corresponding tensile hooks 62 of the electrofusion pipe fitting 38 (process block 94). In particular, as described above, to facilitate matingly interlocking a tensile clip 58 that is secured to the pipe segment tubing 22 with a tensile hook 62 of the electrofusion pipe fitting 38, in some embodiments, the tensile clip 58 and the pipe segment tubing 22 may be inserted into a corresponding tubing cavity 46 of the electrofusion pipe fitting 38 such that the loop end 60 of the tensile clip 58 is between a hook bend 56 of a corresponding tensile hook 52 and the hook shaft 54 of another tensile hook 52 that is adjacent the corresponding tensile hook 52 (process block 122). After the tensile clip 58 and the pipe segment tubing 22 have been inserted, in such embodiments, the electrofusion pipe fitting 38 may then be rotated relative to the tensile clip 58 and the pipe segment tubing 22, for example, such that the hook bend 56 of the tensile hook 52 matingly interlocks with the loop end 60 of the tensile clip 58 (process block 124).

To facilitate maintaining the interlocking between a tensile clip 58 secured to the pipe segment tubing 22 and a corresponding tensile hook 62 of the electrofusion pipe fitting 38, the pipe segment tubing 22 may then be electrofused to the electrofusion pipe fitting 38 (process block 96). As described above, electrofusing the pipe segment tubing 22 to the electrofusion pipe fitting 38 may include bonding electrofusion material in the electrofusion pipe fitting 38 with electrofusion material in the pipe segment tubing 22. In particular, as described above, heat may be applied to melt the electrofusion material in the electrofusion pipe fitting 38 and/or the electrofusion material in the pipe segment tubing 22 such that they bond together once the heat is removed.

To facilitate selectively applying heat, as described above, in some embodiments, an electrofusion pipe fitting 38 may include one or more heating wires 48, which are embedded within electrofusion material of the electrofusion pipe fitting 38, for example, such that they are proximate to one or more tubing cavities 46 of the electrofusion pipe fitting 38. Additionally, as described above, in such embodiments, a heating wire 48 of the electrofusion pipe fitting 38 may be electrically coupled to an electrical power source 40 via one or more external wires (e.g., cables) 42. In other words, in such embodiments, electrofusing the pipe segment tubing 22 to the electrofusion pipe fitting 38 may include supplying electrical power to one or more heating wires 48 implemented in the electrofusion pipe fitting 38, for example, via the electrical power source 40 (process block 126). In this manner, the techniques described in the present disclosure may facilitate improving tensile capacity of a pipeline system in which an electrofusion pipe fitting is deployed, which, at least in some instances, may facilitate improving operational efficiency and/or operational reliability of the pipeline system, for example, at least in part by reducing the likelihood that tensile force exerted on the pipeline system causes the electrofusion pipe fitting to disconnect from a pipe segment secured thereto.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
   a pipe segment that comprises:
      tubing, wherein the tubing comprises an inner barrier layer that defines a pipe bore, a reinforcement layer implemented around the inner barrier layer to define a fluid conduit within the tubing, and an outer barrier layer implemented around the reinforcement layer; and
      a tensile clip secured to the tubing such that clip legs of the tensile clip are secured around the reinforcement layer of the tubing; and
   a pipe fitting that comprises:
      electrofusion material implemented to define a fitting bore and a tubing cavity in which the tubing of the pipe segment is to be secured; and
      a tensile hook partially embedded within the electrofusion material such that a hook bend of the tensile hook extends into the tubing cavity, wherein the hook bend of the tensile hook is configured to matingly interlock with a loop end of the tensile clip that is secured to the tubing of the pipe segment to facilitate transferring tensile force between the reinforcement layer of the tubing and the pipe fitting.

2. The pipeline system of claim 1, wherein:
   the inner barrier layer and the outer barrier layer of the tubing are each implemented using plastic;
   the electrofusion material of the pipe fitting comprises plastic; and
   the tensile clip secured to the tubing of the pipe segment, the reinforcement layer in the tubing of the pipe segment, and the tensile hook of the pipe fitting are each implemented using metal.

3. The pipeline system of claim 1, wherein the electrofusion material of the pipe fitting is configured to be bonded to the inner barrier layer of the tubing, the outer barrier layer of the tubing, or both to facilitate maintaining the hook bend of the tensile hook matingly interlocked with the loop end of the tensile clip that is secured to the tubing of the pipe segment.

4. The pipeline system of claim 1, wherein the pipe fitting comprises a heating wire embedded within the electrofusion material of the pipe fitting.

5. The pipeline system of claim 1, wherein one or more of the clip legs of the tensile clip comprise teeth that extend out therefrom.

6. The pipeline system of claim 1, wherein the tensile clip comprises a guide bar that extends between the clip legs of the tensile clip.

7. The pipeline system of claim 1, wherein:
   the tubing of the pipe segment comprises a first clip opening implemented in the inner barrier layer of the tubing and a second clip opening implemented in the outer barrier layer of the tubing; and
   the tensile clip comprises a first clip leg configured to be secured in the first clip opening and a second clip leg configured to be secured in the second clip opening.

8. The pipeline system of claim 1, wherein:
   the pipe segment tubing comprises another tensile clip secured to the tubing such that other clip legs of the other tensile clip are secured around the reinforcement layer of the tubing; and
   the pipe fitting comprises another tensile hook partially embedded within the electrofusion material such that another hook bend of the other tensile hook extends into the tubing cavity, wherein the other hook bend of the other tensile hook is configured to matingly interlock with another loop end of the other tensile clip that is secured to the tubing of the pipe segment to facilitate transferring tensile force between the reinforcement layer of the tubing and the pipe fitting.

9. The pipeline system of claim 1, comprising another pipe segment that comprises:
   other tubing, wherein the other tubing comprises another inner barrier layer that defines another pipe bore, another reinforcement layer implemented around the other inner barrier layer, and another outer barrier layer implemented around the other reinforcement layer; and
   another tensile clip secured to the other tubing of the other pipe segment such that other clip legs of the other tensile clip are secured around the other reinforcement layer of the other tubing, wherein:
      the electrofusion material of the pipe fitting is implemented to define another tubing cavity in which the other tubing of the other pipe segment is to be secured;
      the tensile hook of the pipe fitting is embedded within the electrofusion material such that another hook bend of the tensile hook extends into the other tubing cavity; and
      the other hook bend of the tensile hook is configured to matingly interlock with another loop end of the other tensile clip that is secured to the other tubing of the other pipe segment to facilitate transferring tensile force between the reinforcement layer of the tubing and the other reinforcement layer of the other tubing.

10. The pipeline system of claim 1, wherein:
   the tensile clip is configured to be secured to the tubing of the pipe segment at least in part by circumferentially compressing the tubing around the clip legs of the tensile clip such that the clip legs grab onto the reinforcement layer in the tubing of the pipe segment; and
   the hook bend of the tensile hook is configured to matingly interlock with the loop end of the tensile clip at least in part by:
      inserting the tubing and the tensile clip of the pipe segment into the tubing cavity of the pipe fitting; and
      rotating the pipe fitting relative to the pipe segment.

11. A method of implementing a pipeline system comprising:
   securing a tensile clip to tubing of a pipe segment that comprises a reinforcement layer implemented between an inner barrier layer of the tubing and an outer barrier layer of the tubing at least in part by:
      inserting clip legs of the tensile clip into corresponding clip openings in the tubing of the pipe segment; and
      circumferentially compressing the tubing of the pipe segment around the clip legs of the tensile clip to enable the clip legs of the tensile clip to grab onto the reinforcement layer in the tubing of the pipe segment;
   inserting the tensile clip and the tubing of the pipe segment into a tubing cavity of a pipe fitting that is defined by electrofusion material of the pipe fitting, wherein the pipe fitting comprises a tensile hook that extends out from the electrofusion material into the tubing cavity; and rotating the pipe fitting relative to the pipe segment such that the tensile hook of the pipe fitting matingly interlocks with the tensile clip that is secured to the tubing of the pipe segment to facilitate transferring tensile force between the pipe segment and the pipe fitting using non-electrofusion material.

12. The method of claim 11, wherein circumferentially compressing the tubing of the pipe segment comprises:

inserting a backing cylinder of special-purpose deployment equipment at least partially into a pipe bore defined by the tubing of the pipe segment; and operating an actuator of the special-purpose deployment equipment to compress the tubing of the pipe segment between an actuator piston of the actuator and the backing cylinder of the special-purpose deployment equipment.

13. The method of claim 11, wherein inserting the clip legs of the tensile clip into corresponding clip openings comprises:

inserting a first clip leg of the tensile clip into a first clip opening that is implemented in the inner barrier layer of the tubing; and inserting a second clip leg of the tensile clip into a second clip opening that is implemented in the outer barrier layer of the tubing.

14. The method of claim 11, comprising securing another tensile clip to the tubing of the pipe segment at least in part by:

inserting other clip legs of the other tensile clip into corresponding clip openings in the tubing of the pipe segment; and circumferentially compressing the tubing of the pipe segment around the other clip legs of the other tensile clip to enable the other clip legs of the other tensile clip to grab onto the reinforcement layer in the tubing of the pipe segment, wherein:

inserting the tensile clip and the tubing of the pipe segment into the tubing cavity comprises inserting the other tensile clip into the tubing cavity, wherein the pipe fitting comprises another tensile hook that extends out from the electrofusion material into the tubing cavity; and rotating the pipe fitting relative to the pipe segment comprises rotating the pipe fitting relative to the pipe segment such that the other tensile hook of the pipe fitting matingly interlocks with the other tensile clip that is secured to the tubing of the pipe segment to facilitate transferring tensile force between the pipe fitting and the pipe segment.

15. The method of claim 11, comprising:

securing another tensile clip to other tubing of another pipe segment that comprises another reinforcement layer implemented between another inner barrier layer of the other tubing and another outer barrier layer of the other tubing at least in part by:

inserting other clip legs of the tensile clip into corresponding clip openings in the other tubing of the other pipe segment; and circumferentially compressing the other tubing of the other pipe segment around the other clip legs of the other tensile clip to enable the other clip legs of the other tensile clip to grab onto the other reinforcement layer in the other tubing of the other pipe segment; and inserting the other tensile clip and the other tubing of the other pipe segment into another tubing cavity of the pipe fitting that is defined by the electrofusion material of the pipe fitting, wherein:

the tensile hook of the pipe fitting extends out from the electrofusion material into the tubing cavity and into the other tubing cavity; and rotating the pipe fitting relative to the pipe segment comprises rotating the pipe fitting relative to the other pipe segment such that the tensile hook of the pipe fitting matingly interlocks with the other tensile clip that is secured to the other tubing of the other pipe segment to facilitate transferring tensile force between the pipe segment and the other pipe segment.

16. An electrofusion pipe fitting comprising:

a tubing cavity in which tubing of a pipe segment is to be secured, wherein the tubing cavity is defined using electrofusion material; and a tensile hook, wherein the tensile hook comprises:

a hook shaft that is at least partially embedded within the electrofusion material of the electrofusion pipe fitting; and a hook bend that extends out from the hook shaft within the tubing cavity of the electrofusion pipe fitting, wherein the hook bend is configured to matingly interlock with a loop end of a tensile clip that is secured around one or more reinforcement layers of the tubing of the pipe segment to facilitate transferring tensile force between the electrofusion pipe fitting and the pipe segment via the tensile clip that is secured to the tubing of the pipe segment and the tensile hook of the electrofusion pipe fitting.

17. The electrofusion pipe fitting of claim 16, comprising a heating wire embedded within the electrofusion material of the electrofusion pipe fitting, wherein the heating wire is configured to facilitate bonding the electrofusion material of the electrofusion pipe fitting with an inner barrier layer in the tubing of the pipe segment, an outer barrier layer in the tubing of the pipe segment, or both.

18. The electrofusion pipe fitting of claim 16, wherein:

the electrofusion material of the electrofusion pipe fitting comprises plastic; and the tensile hook of the electrofusion pipe fitting comprises metal.

19. The electrofusion pipe fitting of claim 16, comprising another a tensile hook, wherein the other tensile hook comprises:

another hook shaft that is at least partially embedded within the electrofusion material of the electrofusion pipe fitting; and another hook bend that extends out from the other hook shaft within the tubing cavity of the electrofusion pipe fitting, wherein the other hook bend is configured to matingly interlock with another loop end of another tensile clip that is secured around the one or more reinforcement layers of the tubing of the pipe segment to facilitate transferring tensile force between the electrofusion pipe fitting and the pipe segment via the other tensile clip that is secured to the tubing of the pipe segment and the other tensile hook of the electrofusion pipe fitting.

20. The electrofusion pipe fitting of claim 16, comprising another tubing cavity in which other tubing of another pipe segment is to be secured, wherein:

the other tubing cavity is defined using the electrofusion material; and the tensile hook comprises another hook bend that extends out from the hook shaft within the other tubing cavity of the electrofusion pipe fitting, wherein the other hook bend is configured to matingly interlock with another loop end of another tensile clip that is secured around the one or more reinforcement layers of the tubing of the pipe segment to facilitate transferring tensile force between the pipe segment and the other pipe segment via the tensile clip that is secured to the tubing of the pipe segment, the tensile hook of the electrofusion pipe fitting, and the other tensile clip that is secured to the other tubing of the other pipe segment.

* * * * *